United States Patent
Noh et al.

(10) Patent No.: US 10,178,626 B2
(45) Date of Patent: *Jan. 8, 2019

(54) METHOD FOR CONTROLLING UPLINK TRANSMISSION POWER AND APPARATUS THEREOF

(71) Applicant: KT CORPORATION, Gyeonggi-do (KR)

(72) Inventors: Minseok Noh, Seoul (KR); Woo-jin Choi, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/617,137

(22) Filed: Jun. 8, 2017

(65) Prior Publication Data

US 2017/0273030 A1     Sep. 21, 2017

Related U.S. Application Data

(63) Continuation of application No. 15/027,002, filed as application No. PCT/KR2014/010565 on Nov. 5, 2014, now Pat. No. 9,713,094.

(30) Foreign Application Priority Data

Nov. 8, 2013   (KR) .................. 10-2013-0135867
Feb. 4, 2014   (KR) .................. 10-2014-0012709
Jul. 15, 2014   (KR) .................. 10-2014-0088948

(51) Int. Cl.
*H04B 7/00*        (2006.01)
*H04W 52/14*     (2009.01)
*H04W 52/34*     (2009.01)

(52) U.S. Cl.
CPC ......... *H04W 52/146* (2013.01); *H04W 52/34* (2013.01)

(58) Field of Classification Search
CPC ........................... H04W 52/146; H04W 52/34
See application file for complete search history.

(56) References Cited

U.S. PATENT DOCUMENTS 8,675,528 B2 *   3/2014   Khoshnevis .......... H04L 1/0026
                                                                                                                                             370/310
9,264,963 B2     2/2016   Yang et al.
(Continued)

FOREIGN PATENT DOCUMENTS

| | | |
|---|---|---|
| CN | 102076072 A | 5/2011 |
| CN | 102238716 A | 11/2011 |

(Continued)

OTHER PUBLICATIONS

State Intellectual Property Office of People's Republic of China, Office Action of corresponding CN Patent Application No. 201480054086.4, dated Jun. 1, 2018.

*Primary Examiner* — Dominic Rego
(74) *Attorney, Agent, or Firm* — IP Legal Services, LLC

(57) ABSTRACT

Provided are a method and an apparatus for controlling uplink transmission power. A method for controlling uplink transmission power by a terminal may include allocating transmission power of one or more uplink control channels and/or one or more uplink data channels in order to transmit the uplink control channels and/or the uplink data channels in two or more cells and transmitting the uplink control channel and/or the uplink data channel to one or more base stations according to the allocated transmission power.

14 Claims, 17 Drawing Sheets

(56) References Cited

U.S. PATENT DOCUMENTS

| | | |
|---|---|---|
| 9,332,508 B2 | 5/2016 | Gaal et al. |
| 9,351,259 B2 | 5/2016 | Suzuki et al. |
| 9,699,779 B2 * | 7/2017 | Marinier ............. H04W 72/044 |
| 2009/0238241 A1 | 9/2009 | Hooli et al. |
| 2010/0238908 A1 | 9/2010 | Wu |
| 2010/0246463 A1 * | 9/2010 | Papasakellariou .. H04W 52/146 |
| | | 370/311 |
| 2011/0274043 A1 * | 11/2011 | Nam ....................... H04L 5/001 |
| | | 370/328 |
| 2011/0274063 A1 * | 11/2011 | Li ........................... H04L 5/001 |
| | | 370/329 |
| 2011/0275403 A1 | 11/2011 | Chen et al. |
| 2011/0280169 A1 | 11/2011 | Seo et al. |
| 2011/0287804 A1 | 11/2011 | Seo et al. |
| 2011/0306383 A1 | 12/2011 | Lee et al. |
| 2011/0310759 A1 * | 12/2011 | Gerstenberger ........ H04L 5/001 |
| | | 370/252 |
| 2012/0087334 A1 | 4/2012 | Suzuki et al. |
| 2012/0089334 A1 | 4/2012 | Ekseth et al. |
| 2012/0093064 A1 | 4/2012 | Horiuchi et al. |
| 2012/0113831 A1 * | 5/2012 | Pelletier ............... H04L 5/0053 |
| | | 370/252 |
| 2012/0178494 A1 * | 7/2012 | Haim .................. H04W 52/365 |
| | | 455/522 |
| 2012/0202554 A1 | 8/2012 | Seo et al. |
| 2012/0213189 A1 | 8/2012 | Choi et al. |
| 2012/0236707 A1 | 9/2012 | Larsson et al. |
| 2013/0010706 A1 | 1/2013 | Kela et al. |
| 2013/0010723 A1 | 1/2013 | Ouchi et al. |
| 2013/0148614 A1 | 6/2013 | Noh et al. |
| 2013/0176953 A1 * | 7/2013 | Stern-Berkowitz ........................... |
| | | H04W 52/146 |
| | | 370/329 |
| 2013/0208710 A1 | 8/2013 | Seo et al. |
| 2013/0215811 A1 | 8/2013 | Takaoka et al. |
| 2013/0223392 A1 | 8/2013 | Seo et al. |
| 2013/0286990 A1 | 10/2013 | Park et al. |
| 2014/0029532 A1 * | 1/2014 | Han .................. H04W 72/0413 |
| | | 370/329 |
| 2014/0050205 A1 | 2/2014 | Ahn et al. |
| 2014/0056271 A1 * | 2/2014 | Ahn .................... H04W 52/146 |
| | | 370/329 |
| 2014/0056278 A1 | 2/2014 | Marinier et al. |
| 2014/0119302 A1 | 5/2014 | Ahn et al. |
| 2014/0126475 A1 | 5/2014 | Ahn et al. |
| 2014/0133415 A1 | 5/2014 | Damnjanovic et al. |
| 2014/0177584 A1 | 6/2014 | Ouchi et al. |
| 2014/0192738 A1 * | 7/2014 | Nam ....................... H04L 5/001 |
| | | 370/329 |
| 2014/0192740 A1 | 7/2014 | Ekpenyong et al. |
| 2014/0219153 A1 | 8/2014 | Seo et al. |
| 2014/0321400 A1 | 10/2014 | Seo et al. |
| 2014/0348108 A1 | 11/2014 | Seo et al. |
| 2014/0349703 A1 | 11/2014 | Seo et al. |
| 2014/0369324 A1 | 12/2014 | Lin et al. |
| 2015/0071222 A1 | 3/2015 | Ahn et al. |
| 2015/0230191 A1 | 8/2015 | Seo et al. |
| 2015/0237585 A1 | 8/2015 | Seo et al. |
| 2015/0245356 A1 | 8/2015 | Seo et al. |
| 2015/0365214 A1 | 12/2015 | Ahn et al. |
| 2016/0081043 A1 | 3/2016 | Seo et al. |
| 2016/0095069 A1 | 3/2016 | Noh et al. |
| 2016/0242121 A1 | 8/2016 | Lin et al. |
| 2018/0124712 A1 | 5/2018 | Lin et al. |

FOREIGN PATENT DOCUMENTS

| | | |
|---|---|---|
| CN | 102934498 A | 2/2013 |
| CN | 103220768 A | 7/2013 |
| KR | 10-2009-0015508 A | 2/2009 |
| KR | 10-2010-0088083 A | 8/2010 |
| KR | 10-2012-0014880 A | 2/2012 |
| KR | 10-2012-0101334 A | 9/2012 |
| KR | 10-2012-0112369 A | 10/2012 |
| KR | 10-2013-0050267 A | 5/2013 |
| KR | 10-2013-0077387 A | 7/2013 |
| WO | 2013/048188 A2 | 4/2013 |

* cited by examiner

——— BACKHAUL LINK WITHIN CLUSTER

—·—·— BACKHAUL LINK BETWEEN SMALL CELLS & MACRO CELL

— BACKHAUL LINK WITHIN CLUSTER

-·-·-·- BACKHAUL LINK BETWEEN SMALL CELLS & MACRO CELL

FIG.8
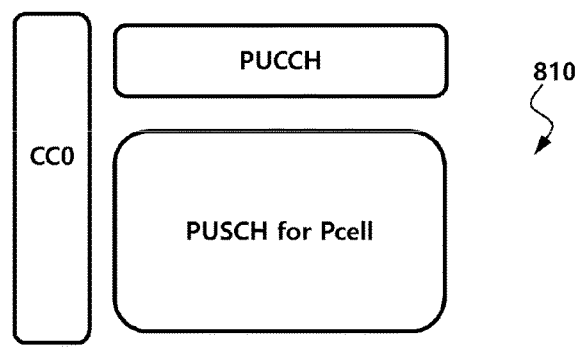
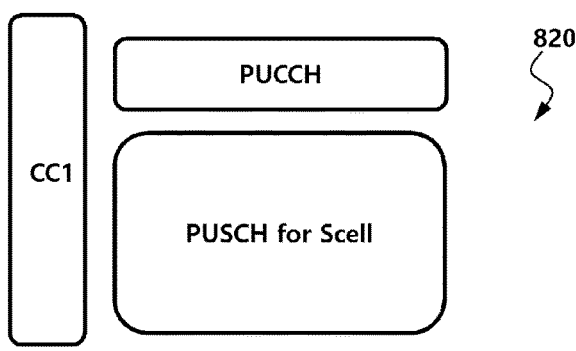

*FIG. 10*
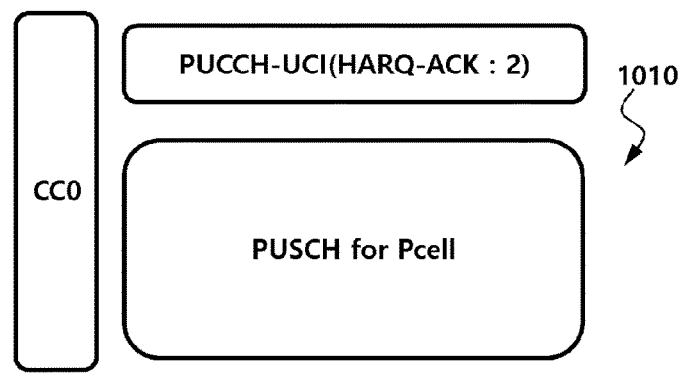
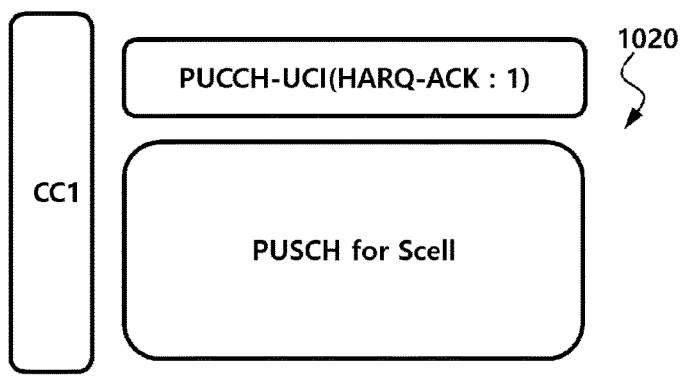

METHOD FOR CONTROLLING UPLINK TRANSMISSION POWER AND APPARATUS THEREOF

CROSS REFERENCE TO RELATED APPLICATIONS

The application is a Continuation of U.S. patent application Ser. No. 15/027,002 (filed on Apr. 4, 2016), which is a National Stage Patent Application of PCT International Patent Application No. PCT/KR2014/010565 (filed on Nov. 5, 2014) under 35 U.S.C. § 371, which claims priority to Korean Patent Application Nos. 10-2013-0135867 (filed on Nov. 8, 2013), 10-2014-0012709 (filed on Feb. 4, 2014), and 10-2014-0088948 (filed on Jul. 15, 2014), the teachings of which are incorporated herein in their entireties by reference.

TECHNICAL FIELD

The present disclosure relates to a method and an apparatus for controlling uplink transmission power and, more specifically, to a method and an apparatus for allocating transmission power in performing uplink transmission in two or more cells.

BACKGROUND ART

With the progress of communication systems, a wide variety of wireless terminals has been introduced to consumers such as companies and individuals. A current mobile communication system has been affiliated with Third Generation Partnership Project (3GPP), for example, Long Term Evolution (LTE), LTE-Advanced (LTE-A), and the like. Such a mobile communication system is a high-speed and high-capacity communication system capable of transmitting and receiving various data, such as image data, wireless data, and the like, beyond providing voice services. Accordingly, it is required to develop a technology for transmitting a large amount of data at a high speed similar to that of a wired communication network. Meanwhile, various deployments for multiple cells or a small cell have been introduced. Accordingly, there is a need for a technology and a method for enabling carrier aggregation to be applied in various development scenarios. Particularly, there is a need for a technology for controlling power transmission when uplink transmission is performed in multiple cells.

DETAILED DESCRIPTION OF THE INVENTION

Technical Problem

An aspect of the present disclosure is to provide a technology for controlling transmission power when a user equipment performs uplink transmission to two or more cells and two or more base stations. More specifically, an aspect of the present disclosure is to provide a method and an apparatus for controlling power of uplink transmission transmitted in uplink by a user equipment when the user equipment transmits a Physical Uplink Control CHannel (PUCCH) in two or more cells, when the user equipment simultaneously transmits a PUCCH through different serving cells, and when the user equipment simultaneously transmits a PUCCH to different base stations.

Technical Solution

In accordance with an aspect of the present disclosure, there is provided a method for controlling uplink transmission power by a user equipment. The method includes: allocating transmission power of at least one Physical Uplink Control CHannel (PUCCH) and/or transmission power of at least one Physical Uplink Shared CHannel (PUSCH) in order to transmit the PUCCH and/or the PUSCH on two or more cells; and transmitting the PUCCH and/or the PUSCH to at least one base station according to the allocated transmission power.

In accordance with another aspect of the present disclosure, there is provided a method for controlling uplink transmission power of a user equipment by a base station. The method includes: transmitting, to the user equipment, a Radio Resource Control (RRC) configuration parameter as indication information indicating simultaneous transmission of Uplink Control Information (UCI) on two or more cells; and receiving, from the user equipment, at least one Physical Uplink Control CHannel (PUCCH) and/or at least one Physical Uplink Shared CHannel (PUSCH), which haves transmission power controlled according to the indication information.

In accordance with still another aspect of the present invention, there is provided a user equipment for controlling uplink transmission power. The user equipment includes: a reception unit configured to receive a downlink from a base station; a control unit configured to allocate transmission power of at least one Physical Uplink Control CHannel (PUCCH) and/or transmission power of at least one Physical Uplink Shared CHannel (PUSCH) in order to transmit the PUCCH and/or the PUSCH on two or more cells; and a transmission unit configured to transmit the PUCCH and/or the PUSCH to at least one base station according to the allocated transmission power.

In accordance with yet another aspect of the present invention, there is provided a base station for controlling uplink transmission power of a user equipment. The base station includes: a transmission unit configured to transmit, to the user equipment, a Radio Resource Control (RRC) configuration parameter as indication information indicating simultaneous transmission of Uplink Control Information (UCI) on two or more cells; a reception unit configured to receive, from the user equipment, at least one Physical Uplink Control CHannel (PUCCH) and/or at least one Physical Uplink Shared CHannel (PUSCH), each having transmission power controlled according to the indication information; and a control unit configured to control the transmission unit and the reception unit.

Advantageous Effects

In accordance with at least one embodiment, it is possible to control transmission power in uplink transmission in two or more cells. In accordnace with at least one embodiment, a method and an apparatus are provided for controlling power of uplink transmission transmitted in uplink by a user equipment when of the user equipment transmits a PUCCH to an identical base station and different base stations in two or more cells and when the user equipment simultaneously transmits a PUCCH through different serving cells.

BRIEF DESCRIPTION OF THE DRAWINGS

FIG. 8 is a view illustrating an exemplary application of a specific method 1 according to an embodiment of the present disclosure.

FIG. 10 is a view illustrating an exemplary of a specific method 3 according to still another embodiment of the present disclosure.

MODE FOR CARRYING OUT THE INVENTION

Figure 1:
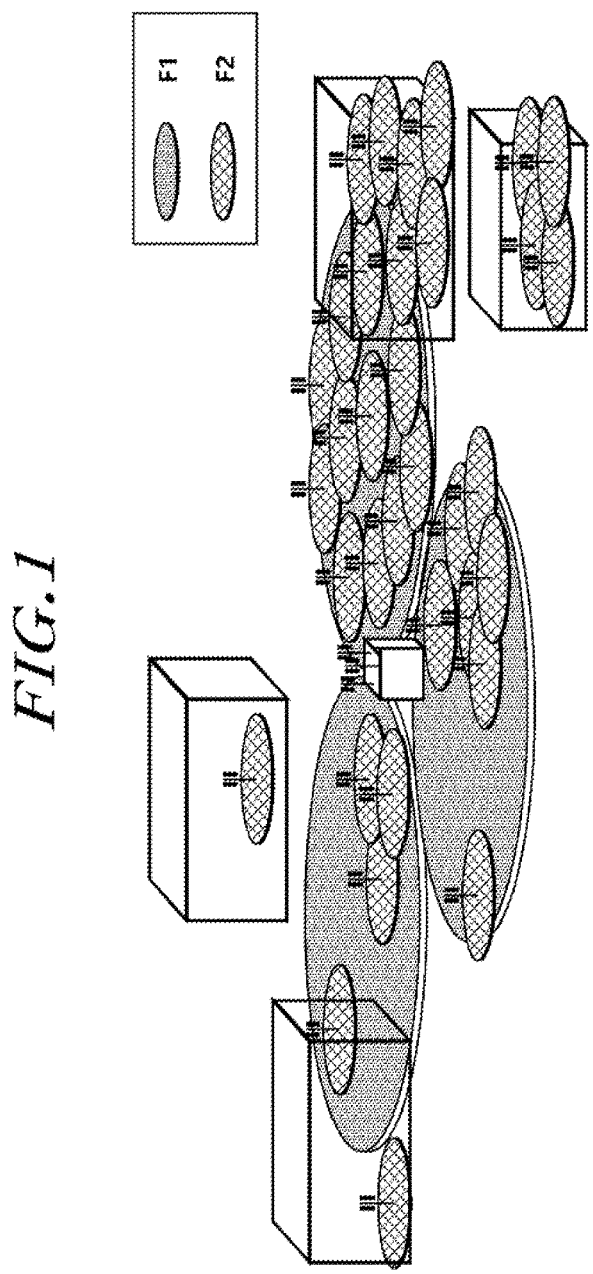
FIG. 1 is a view illustrating small cell deployment according to an embodiment of the present disclosure.

Hereinafter, exemplary embodiments of the present disclosure will be described in detail with reference to the accompanying drawings. It should be noted that in assigning reference numerals to elements in the drawings, the same elements will be designated by the same reference numerals although they are shown in different drawings. Further, in the following description of the present disclosure, a detailed description of known functions and configurations incorporated herein will be omitted when it may make the subject matter of the present invention rather unclear.

In accordance with at least one embodiment, a wireless communication system is widely arranged in order to provide various communication services, such as voice, packet data, and the like. The wireless communication system includes a User Equipment (UE) and a Base Station (BS). In this specification, the UE has a comprehensive concept implying a terminal in wireless communication. Accordingly, the UEs should be interpreted as a concept including a Mobile Station (MS), a User Terminal (UT), a Subscriber Station (SS), a wireless device, and the like in Global System for Mobile Communications (GSM) as well as User Equipments (UEs) in Wideband Code Division Multiple Access (WCDMA), Long Term Evolution (LTE), High Speed Packet Access (HSPA), and the like. Hereinafter, in this specification, the UE may be simply referred to as a "terminal." Hereinafter, in this specification, the UE may be simply referred to as a "terminal."

The BS or a cell usually refers to a station communicating with the UE. The BS or the cell may be called different terms, such as a Node-B, an evolved node B (eNB), a sector, a site, a Base Transceiver System (BTS), an Access Point (AP), a relay node, a Remote Radio Head (RRH), a Radio Unit (RU), a small cell, and the like.

Specifically, in this specification, the BS or the cell should be interpreted as having a comprehensive meaning indicating a partial area or a function covered by a Base Station Controller (BSC) in Code Division Multiple Access (CDMA), by a Node-B in Wideband Code Division Multiple Access (WCDMA), or by an eNB or a sector (or a site) in LTE. Accordingly, the BS or the cell has a comprehensive meaning including various coverage areas such as a megacell, a macrocell, a microcell, a picocell, a femtocell, a communication range of a relay node, that of an RRH, that of a RU, that of a small cell, and the like.

Each of the above enumerated various cells has a BS that controls a corresponding cell, and thus, the BS may be interpreted in two senses: i) the BS may be a device itself that provides a megacell, a macrocell, a microcell, a picocell, a femtocell, and a small cell in relation to a wireless area, or ii) the BS may indicate the wireless area itself. In i), a BS may be all devices that interact with one another so as to enable the devices providing a predetermined wireless area to be controlled by an identical entity or to cooperatively configure the wireless area. According to a scheme for configuring a wireless area, the BS may include an eNB, an RRH, an antenna, a RU, a Low Power Node (LPN), a point, a transmission/reception point, a transmission point, a reception point, and the like. In ii), a BS may be a wireless area itself that receives or transmits a signal from the perspective of a UE or a neighboring BS.

Accordingly, a megacell, a macrocell, a microcell, a picocell, a femtocell, a small cell, an RRH, an antenna, a RU, an LPN, a point, an eNB, a transmission/reception point, a transmission point, and a reception point are commonly referred to as a "BS."

In this specification, the UE and the BS, which are two transmission and reception subjects used to implement the art or the technical idea described in this specification, are used as a comprehensive meaning, and are not limited by a particularly designated term or word. Here, the term "uplink (UL)" refers to a scheme for performing transmission and reception of data by the UE with respect to the BS, and the term "downlink (DL)" refers to a scheme for performing transmission and reception of data by the BS with respect to the UE.

There is no limit to multiple access schemes applied to the wireless communication system. For example, use may be made of various multiple access schemes, such as Code Division Multiple Access (CDMA), Time Division Multiple Access (TDMA), Frequency Division Multiple Access (FDMA), Orthogonal Frequency Division Multiple Access (OFDMA), OFDM (Orthogonal Frequency Division Multiplexing)-FDMA, OFDM-TDMA, and OFDM-CDMA. An embodiment of the present invention may be applied to the allocation of resources in the field of asynchronous wireless communications which have gone through GSM, WCDMA and HSPA, and evolve into LTE and LTE-advanced, and in the field of synchronous wireless communications which evolve into CDMA, CDMA-2000 and Ultra Mobile Broadband (UMB). The present invention should not be interpreted as being limited to or restricted by a particular wireless communication field, but should be interpreted as including all technical fields to which the spirit of the present invention can be applied.

In this regard, use may be made of a Time Division Duplex (TDD) scheme in which UL transmission and DL transmission are performed at different times. Alternatively, use may be made of a Frequency Division Duplex (FDD)

scheme in which UL transmission and DL transmission are performed at different frequencies.

Also, in a system such as LTE or LTE-A, a specification is established by configuring UL and DL based on one component carrier or one component carrier pair. In UL and DL, control information is transmitted through a control channel, such as a Physical Downlink Control CHannel (PDCCH), a Physical Control Format Indicator CHannel (PCFICH), a Physical Hybrid ARQ Indicator CHannel (PHICH), a Physical Uplink Control CHannel (PUCCH), EPDCCH (Enhanced Physical Downlink Control CHannel), and the like. In UL and DL, a data channel, such as a Physical Downlink Shared CHannel (PDSCH), a Physical Uplink Shared CHannel (PUSCH), and the like, is configured and is then used to transmit data.

Control information may be transmitted by using an EPDCCH (Enhanced PDCCH or Extended PDCCH).

In this specification, a cell may refer to the coverage of a signal transmitted from a transmission/reception point, a component carrier having the coverage of the signal transmitted from the transmission/reception point (transmission point or transmission/reception point), or the transmission/reception point itself A wireless communication system, to which embodiments of the present invention are applied, may be a Coordinated Multi-Point transmission/reception (CoMP) system where two or more transmission/reception points cooperatively transmit a signal, a coordinated multi-antenna transmission system, or a coordinated multi-cell communication system. A CoMP system may include at least two multi-transmission/reception points and UEs.

The multi-transmission/reception point may be at least one RRH. The at least one RRH is connected to one of the BS, a macro cell, and an eNB through an optical cable or an optical fiber. The at least one RRH is controlled by wire. The at least one RRH has high transmission power or has low transmission power in an area of the macro cell.

In this specification, transmission power may signify transmission electric power or a power value, and the transmission power may be expressed and described as P representing Power.

Hereinafter, a DL refers to communication or a communication path from a multi-transmission/reception point to a UE, and a UL refers to communication or a communication path from a UE to a multi-transmission/reception point. In a DL, a transmitter may be a part of a multi-transmission/reception point and a receiver may be a part of a UE. In a UL, a transmitter may be a part of a UE and a receiver may be a part of a multi-transmission/reception point.

Hereinafter, a situation in which a signal is transmitted and received through a channel, such as a PUCCH, a PUSCH, a PDCCH, a PDSCH, an EPDCCH, a PDSCH, or the like, may be expressed as transmitting or receiving a PUCCH, a PUSCH, a PDCCH, a PDSCH, an EPDCCH, or a PDSCH.

Also, hereinafter, the description "transmission or reception of a PDCCH" or "transmission or reception of a signal through a PDCCH" may be used in a sense including the transmission or reception of a PDCCH or the transmission or reception of a signal through a PDCCH.

Specifically, a physical downlink control channel described below may signify a PDCCH or an EPDCCH, and may also be used in a sense including both a PDCCH and an EPDCCH.

Further, in accordance with an embodiment, an EPDCCH may be applied even to a part in which a physical downlink control channel is described as a PDCCH for convenience of description, and an EPDCCH may also be applied to a part, in which a physical downlink control channel is described as an EPDCCH.

Meanwhile, higher layer signaling described below includes Radio Resource Control (RRC) signaling, through which RRC information including an RRC parameter is transmitted.

An eNB is one embodiment of a BS, and the eNB performs DL transmission to UEs. The eNB may transmit a PDSCH which is a primary physical channel for unicast transmission, and may transmit a PDCCH for transmitting DL control information, such as scheduling and the like required to receive a PDSCH, and scheduling grant information for transmitting a UL data channel (e.g., a PUSCH). Hereinafter, the transmission and reception of a signal through each channel will be described as transmission and reception of a corresponding channel.

A small cell using a low-power node is considered as a means for coping with mobile traffic explosion. A low-power node refers to a node using transmission (Tx) power lower than that of a typical macro node.

Through Carrier Aggregation (hereinafter referred to as "CA") technology before $3^{rd}$ Generation Partnership Project (3GPP) Release 11, a small cell may be built by using a low-power Remote Radio Head (RRH) which is geographically-distributed antennas within a macro cell coverage.

However, in order to apply the CA technology, the macro cell and the RRH cell are built to be scheduled under the control of one BS. To this end, it is required to build an ideal backhaul between the macro cell node and the RRH.

The ideal backhaul refers to a backhaul showing very high throughput and a very short delay, such as a dedicated point-to-point connection using an optical line (optical fiber) and a Line-Of-Sight (LOS) microwave.

In contrast, a non-ideal backhaul refers to a backhaul showing relatively low throughput and a relatively long delay, such as a Digital Subscriber Line (xDSL) and a non-LOS microwave.

Through the above-described single BS-based CA technology, multiple serving cells may be aggregated and may provide a service to the UE. Specifically, the multiple serving cells may be configured for the UE in a Radio Resource Control (hereinafter referred to as "RRC")-connected state, and the macro cell and the RRH cell may be configured together as a serving cell and may provide a service to the UE, when the ideal backhaul is built between the macro cell node and the RRH.

When the single BS-based CA technology is configured, the UE may have only one RRC connection with a network.

At RRC connection establishment/re-establishment/handover, one serving cell provides Non-Access Stratum (hereinafter referred to as "NAS") mobility information (e.g., a Tracking Area Identity (TAI)), and at RRC connection re-establishment/handover, one serving cell provides a security input. Such a cell is referred to as a "Primary Cell (Pcell)." The Pcell may be changed according to only a handover procedure. According to UE capabilities, Secondary Cells (Scells) and a Pcell may be configured together as a serving cell.

Hereinafter, the present disclosure relates to an operating method and an apparatus of a UE, which enable the UE belonging to a relevant BS to support a joint operation of FDD and TDD when a small cell and an optional cell/BS/RRH/antenna/RU support different duplex modes (i.e., FDD and TDD) in a multilayer cell structure, and a method for a BS using the relevant method and an apparatus for the same. Also, the present disclosure relates to a method for designating an Scell when each duplex mode is used in a macro cell, a small cell, and an optional cell/BS/RRH/antenna/RU regardless of a duplex mode and supports CA of a macro cell and a small cell, a joint operation thereof, and a dual connectivity therebetween.

Also, a UE in this specification may communicate with one or more cells or BSs. Further, the UE may group one or more cells and may communicate with the grouped cells. Specifically, the UE may perform communication in various forms. In this case, the above-described transmission power may signify transmission power for each of the one or more cells, for each above-described group, or for each above-described BS, according to the respective communication forms. Hereinafter, for the convenience of understanding, the above-described transmission power will be described and explained as total transmission power.

Hereinafter, a small cell deployment scenario, to which embodiments of the present disclosure can be applied, will be described.

FIG. 1 is a view illustrating small cell deployment according to an embodiment of the present disclosure.

Figure 2:
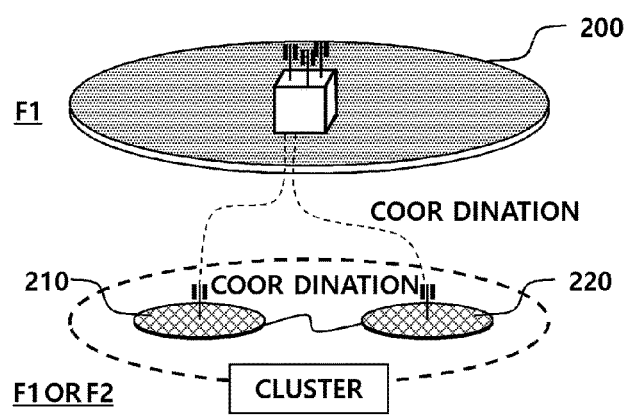
FIG. 2 is a view illustrating a small cell deployment scenario.
Figure 3:
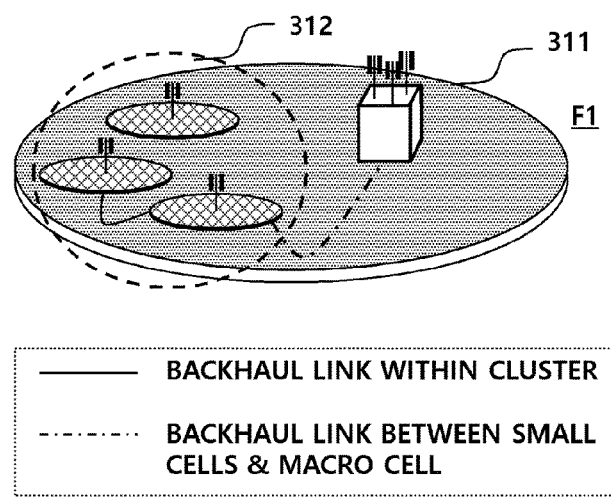
FIGS. 3 to 6 are views each illustrating a specific scenario of small cell deployment.

FIG. 1 illustrates small cell deployment where small cells co located with macro cells. In FIG. 2 and FIG. 3 below, small cell deployments are classified in more detail according to whether macro coverage exists, whether a relevant small cell is for outdoor or indoor use, whether deployment of relevant small cells is in a sparse situation or in a dense situation, and whether a frequency spectrum identical to that of a macro is used from the perspective of a spectrum. The configuration of a specific scenario will be described with reference to FIG. 2 to FIG. 6.

FIG. 2 is a view illustrating a small cell deployment scenario. FIG. 2 illustrates a typical representative scenario among scenarios shown in FIG. 3 to FIG. 6. FIG. 2 illustrates the small cell deployment scenario. The small cell deployment scenario includes scenarios #1, #2a, #2b, and #3. Reference numeral 200 indicates a macro cell, and each of reference numerals 210 and 220 indicates a small cell. In FIG. 2, an overlaid macro cell may exist or may not exist. Coordination may be performed between the macro cell 200 and the small cells 210 and 220, and coordination may also be performed between the small cells 210 and 220. Further, overlaid areas of the macro cell 200 and the small cells 210 and 220 may be tied to a cluster.

FIG. 3 to FIG. 6 are views each illustrating a specific scenario of small cell deployment.

FIG. 3 illustrates a scenario #1 of small cell deployment. The scenario 1 is a co-channel deployment scenario of a small cell and a macro cell in the existence of an overhead macro. The scenario 1 is an outdoor small-cell scenario. Reference numeral 310 indicates a case where a macro cell 311 and small cells are all outdoor cells, and reference numeral 312 indicates a small cell cluster. All users are distributed in indoor and outdoor environments.

Solid lines connecting the small cells within the small cell cluster 312 denote a backhaul link within the cluster. Dotted lines connecting the macro cell BS to the small cells within the cluster denote a backhaul link between the small cells and the macro cell.

Figure 4:
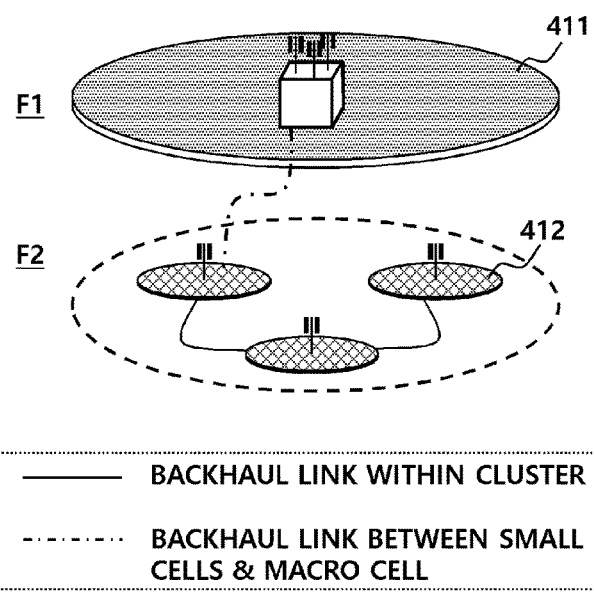

FIG. 4 illustrates a small cell deployment scenario #2a. The scenario 2a is a deployment scenario in which small cells and a macro use different frequency spectrums in the existence of an overlaid macro, and the scenario 2a is an outdoor small-cell scenario. The macro cell 411 and the small cells are all outdoor cells, and reference numeral 412 indicates a small cell cluster. All users are distributed in indoor and outdoor environments.

Solid lines connecting the small cells within the small cell cluster 412 denote a backhaul link within the cluster. Dotted lines connecting the macro cell BS to the small cells within the cluster indicate a backhaul link between the small cells and the macro cell.

Figure 5:
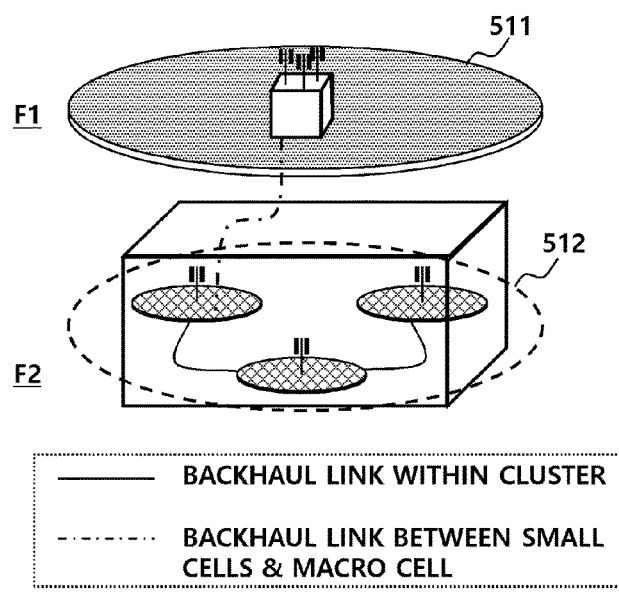

FIG. 5 illustrates a small cell deployment scenario #2b. The Scenario 2b is a deployment scenario in which small cells and a macro use different frequency spectrums in the existence of an overlaid macro. The scenario 2b is an indoor small-cell scenario. The macro cell 511 is an outdoor cell, and the small cells are all indoor cells. Reference numeral 512 indicates a small cell cluster. All users are distributed in indoor and outdoor environments.

Solid lines connecting the small cells within the small cell 512 denote a backhaul link within the cluster. Dotted lines connecting the macro cell BS to the small cells within the cluster indicate a backhaul link between the small cells and the macro cell.

Figure 6:
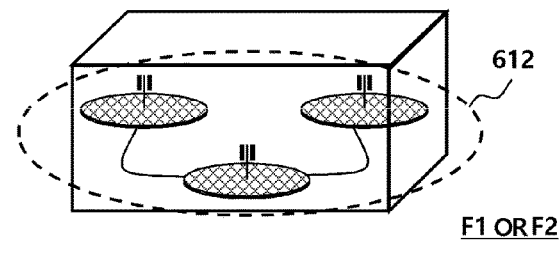

FIG. 6 illustrates a small cell deployment scenario #3. The scenario 3 is an indoor small-cell scenario in a situation where the coverage of a macro does not exist. Reference numeral 612 indicates a small cell cluster. Also, the small cells are all indoor cells, and all users are distributed in indoor and outdoor environments.

Solid lines connecting the small cells within the small cell 612 signify a backhaul link within the cluster. Dotted lines connecting the macro cell BS to the small cells within the cluster denote a backhaul link between the small cells and the macro cell.

A shown, frequencies F1 and F2 are used in FIG. 1 and the various small cell scenarios of FIG. 2 to FIG. 6. The frequencies F1 and F2 may be frequencies supporting an identical duplex mode or may have different duplex modes, respectively. For example, a case may be considered in which F1 is a frequency supporting an FDD mode and F2 is a frequency supporting a TDD mode. Alternatively, another case may be considered in which F1 is a frequency supporting a TDD mode and F2 is a frequency supporting an FDD mode.

Figure 7:
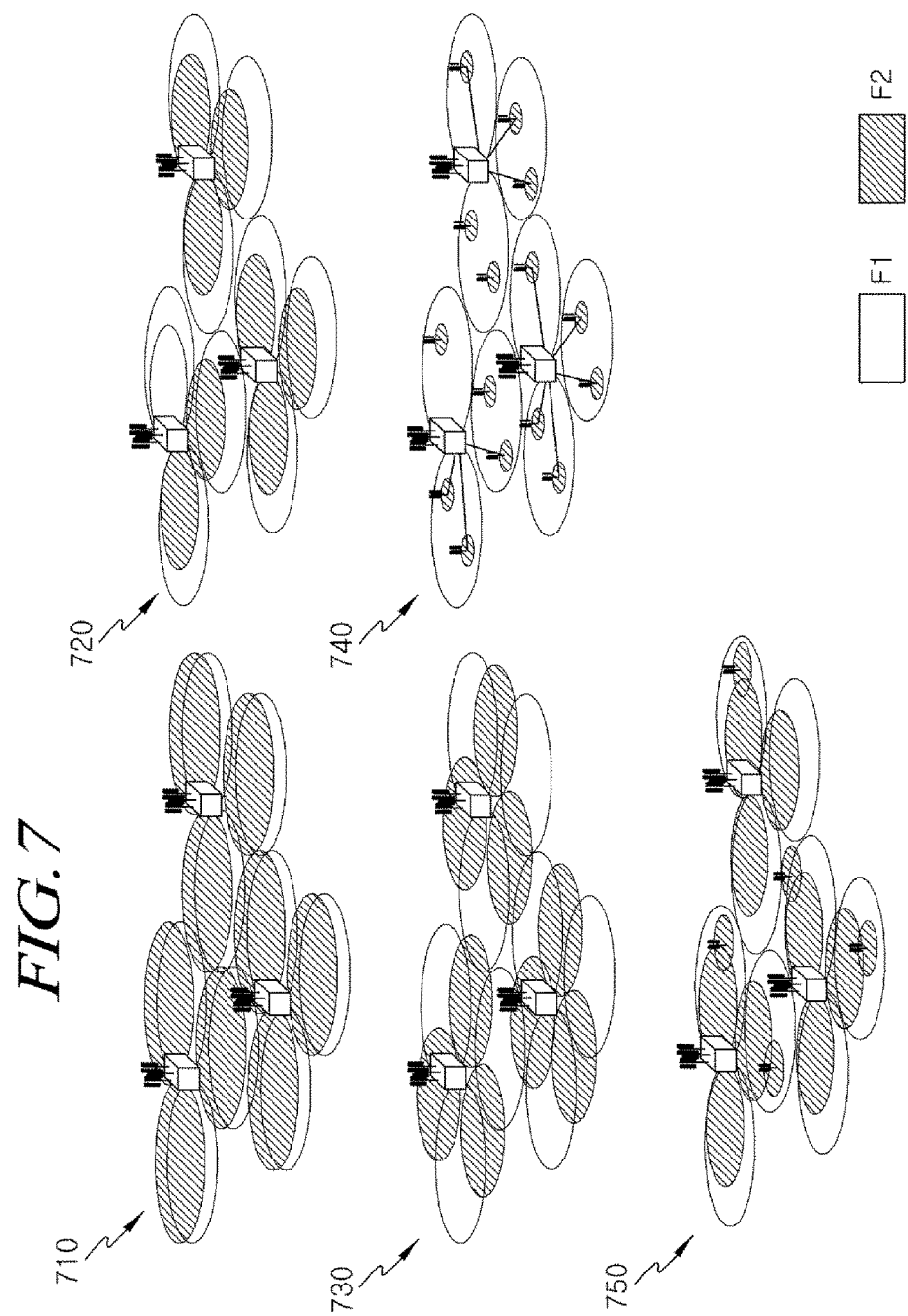
FIG. 7 is a view illustrating various scenarios of carrier aggregation.

FIG. 7 is a view illustrating various scenarios of CA.

Referring to FIG. 7, even in a CA scenario, the frequencies F1 and F2 may be frequencies supporting an identical duplex mode or frequencies supporting different duplex modes.

Reference numeral 710 indicates that F1 and F2 cells are co-located and overlaid under coverages which are nearly identical to each other. Reference numeral 710 indicates a scenario in which the two layers provide sufficient coverage and mobility and the overlaid F1 and F2 cells may be aggregated.

Reference numeral 720 indicates a scenario in which the F1 and F2 cells are co-located and overlaid but the coverage of the F2 cell is smaller than that of the F1 cell. Reference numeral 720 indicates the scenario in which the frequency F1 has sufficient coverage, mobility support is also performed based on the F1 coverage, the frequency F2 is used to improve throughput, and the overlaid F1 and F2 cells may be aggregated.

Reference numeral 730 indicates a scenario in which the F1 and F2 cells are co-located but F2 antennas are directed to the edge of a cell in order to increase cell edge throughput. Reference numeral 730 indicates the scenario in which mobility support is performed based on the F1 coverage, and the frequency F1 has sufficient coverage but the frequency F2 temporarily has a coverage hole. In the scenario, the F1 and F2 cells in an identical eNB may be aggregated at a place where coverages of the F1 and F2 cells are overlaid.

Reference numeral 740 indicates a scenario in which the frequency F1 has macro coverage and an RRH at F2 is used to improve throughput in a hot spot area. In the scenario, mobility support is performed based on the F1 coverage and the F1 macro cell and cells of F2 RRHs may be aggregated together.

Similarly to the scenario indicated by reference numeral 720, a scenario indicated by reference numeral 750 is a scenario in which frequency-selective repeaters are deployed to extend the coverage of one carrier. In the scenario, the F1 and F2 cells in an identical eNB may be aggregated at a place where coverages of the F1 and F2 cells are overlaid.

A PUCCH used as a UL control channel will be briefly described. The UL PUCCH has formats classified according to the type of information transmitted by the UE. The type of format of a PUCCH and a purpose of use thereof will be described below.

A structure of a PUCCH will be described below.

A PUCCH is used as a UL control channel, and the PUCCH has formats classified according to the type of information transmitted by the UE. The type of format of a PUCCH and a purpose of use thereof will be described below.

A PUCCH format 1 is a channel format for transmitting only a scheduling request.

A PUCCH format 1a and a PUCCH format 1b are channel formats used to transmit a scheduling request and/or an Acknowledgement/Negative acknowledgement (Ack/Nack) for a DL data channel. The PUCCH format 1a is distinguished from the PUCCH format 1b according to the number of bits of the Ack/Nack and a modulation scheme.

A shortened PUCCH format 1a and a shortened PUCCH format 1b are formats obtained by puncturing a last SC-FDMA symbol of one subframe in PUCCH format 1a/1b for transmitting an Ack/Nack (A/N). One of the shortened PUCCH format 1a and the shortened PUCCH format 1b is determined to use by whether "ackNackSRS-SimultaneousTransmission" is true or false and based on a configuration of cell-specific information of a Sounding Reference Signal (SRS).

The "ackNackSRS-SimultaneousTransmission" is an RRC parameter according to an indication by a higher layer of the BS A PUCCH format 2 is a channel format for transmitting only a Channel Quality Indicator (CQI).

PUCCH formats 2a and 2b are channel formats used to transmit "CQI+Ack/Nack for DL data channel". The PUCCH format 2a is distinguished from the PUCCH format 2b according to the number of bits of an Ack/Nack and a modulation scheme.

A PUCCH format 3 is a channel format used to transmit an Ack/Nack of 4 bits or more under DL CA.

A shortened PUCCH format 3 is a format obtained by puncturing a last SC-FDMA symbol of one subframe in a PUCCH format 3 used to transmit an Ack/Nack. The shortened PUCCH format 3 is determined to be used by whether "ackNackSRS-SimultaneousTransmission" is true or false and based on a configuration of cell-specific information of an SRS. The "ackNackSRS-SimultaneousTransmission" is an RRC parameter according to an indication by a higher layer of the BS.

Hereinafter, a brief description will be made on a power limited case in which power of a UE is limited and a non-power limited case in which the power of the UE is not limited, as a method for performing power control between UL transmission channels, between a UL channel and SRSs, and between SRSs, under CA which considers a case of the transmission of a PUCCH in one serving cell without regard to multiple PUCCHs.

When the sum of total transmission power of a UE exceeds $\hat{P}_{CMAX}(i)$ representing maximum transmission power according to respective communication forms with respect to the UE configured to simultaneously transmit a PUCCH and a PUSCH, in determining transmission power of the PUSCH for a serving cell c, the UE sets power of the PUCCH to have a priority and determines transmission power of the PUSCH by scaling transmission power of the relevant PUSCH with respect to a value between 0 and 1 with respect to remaining transmission power except for the power of the PUCCH. The UE determines transmission power of the relevant PUSCH by using Equation 1 below.

$$\sum_c w(i) \cdot \hat{P}_{PUSCH,c}(i) \leq (\hat{P}_{CMAX}(i) - \hat{P}_{PUCCH}(i)) \quad \text{Equation 1}$$

Here, the UE performs scaling $\hat{P}_{PUSCH,c}(i)$ according to Equation 1 in a situation same as a situation of a subframe i of the serving cell c. In Equation 1, $\hat{P}_{PUCCH}(i)$ represents a linear value of $P_{PUCCH}(i)$, $\hat{P}_{PUSCH,c}(i)$ represents a linear value of $P_{PUSCH,c}(i)$, $\hat{P}_{CMAX}(i)$ represents a linear value of maximum transmission power (total configured maximum output power) $P_{CMAX}$ which is configured for the entire UE in the subframe i. w(i) represents a scaling factor of $\hat{P}_{PUSCH,c}(i)$ for the serving cell c, and has a value in a range of $0 \leq w(i) \leq 1$. When a PUCCH is not transmitted in the subframe i, $\hat{P}_{PUCCH,c}(i)=0$.

Meanwhile, when the sum of the total transmission power of the UE exceeds $\hat{P}_{CMAX}(i)$, in determining transmission power for transmission between PUSCHs transmitted through different carriers or different serving cells, the UE prioritizes a serving cell or a component carrier, through which a PUSCH with Uplink Control Information (UCI) is transmitted, and the UE allocates PUSCH transmission power to the prioritized serving cell or component carrier on the basis of whether information included in the relevant PUSCH includes UCI. Then, the UE performs scaling by using an identical scaling factor between remaining serving cell(s) or remaining component carriers and determines transmission power of the PUSCH. Here, the UE may set a scaling factor to 0 for particular serving cell(s) or a particular component carrier. The UE determines transmission power of the relevant PUSCH by using Equation 2 below.

$$\sum_{c \neq j} w(i) \cdot \hat{P}_{PUSCH,c}(i) \leq (\hat{P}_{CMAX}(i) - \hat{P}_{PUCCH,j}(i)) \quad \text{Equation 2}$$

The UE transmits a PUSCH together with UCI (performs PUSCH transmission with UCI) in a serving cell j. When the UE transmits a PUSCH without UCI in another serving cell, the total transmission power of the UE may exceed $\hat{P}_{CMAX}(i)$. In this case, the UE scales $\hat{P}_{PUSCH,c}(i)$ so as to satisfy Equation 2 in a subframe i through which the UE transmits a PUSCH without UCI.

In Equation 2, $\hat{P}_{PUSCH,j}(i)$ represents transmission power of the PUSCH when the PUSCH is transmitted together with the UCI, w(i) represents a scaling factor of $\hat{P}_{PUSCH,c}(i)$ for the serving cell c without UCI. In this case, $$\sum_{c \neq j} w(i) \cdot \hat{P}_{PUSCH,c}(i) = 0,$$

and the power scaling is not applied to $\hat{P}_{PUSCH,j}(i)$ when the total transmission power of the UE does not exceed $\hat{P}_{CMAX}(i)$. Here, w(i) may be set to have an identical value when i is greater than or equal to 0, and may have a value of 0 in a particular serving cell.

When the sum of the total transmission power of the UE exceeds $\hat{P}_{CMAX}(i)$, in determining transmission power for transmission between "PUCCH+PUSCH with UCI" and PUSCHs without UCI which are transmitted through different carriers or different serving cells, the UE sets transmission power of the PUCCH to be ensured in a prioritized manner, and sets transmission power of a PUSCH with UCI to be ensured. Then, with respect to the remaining transmission power of the UE, the UE performs scaling by using an identical scaling factor between remaining serving cell(s) or remaining component carriers and determines the transmission power of the PUSCH. Here, the UE may set a scaling factor to 0 for particular serving cell(s) or a particular component carrier. The UE determines transmission power of the relevant PUSCH by using Equation 3 below.

$$\hat{P}_{PUSCH,j}(i) = \min(\hat{P}_{PUSCH,j}(i), (\hat{P}_{CMAX}(i) - \hat{P}_{PUCCH}(i)))$$

$$\sum_{c \neq j} w(i) \cdot \hat{P}_{PUSCH,c}(i) \leq (\hat{P}_{CMAX}(i) - \hat{P}_{PUCCH}(i) - \hat{P}_{PUSCH,j}(i))$$

Equation 3

When the UE simultaneously transmits a PUCCH and a PUSCH with UCI in the serving cell j and transmits a PUSCH without UCI in another serving cell, the total transmission power of the UE may exceed $\hat{P}_{CMAX}(i)$, and the UE may obtain $\hat{P}_{PUSCH,c}(i)$ according to Equation 3.

When the sum of the total transmission power of the UE exceeds $\hat{P}_{CMAX}(i)$, in determining transmission power for transmission between SRSs transmitted through different carriers or different serving cells, the UE performs scaling by using an identical scaling factor between serving cell(s) or component carriers, and determines transmission power of an SRS. The UE determines transmission power of each of the relevant SRSs by using Equation 4 below.

$$\sum_{c} w(i) \cdot \hat{P}_{SRS,c}(i) \leq \hat{P}_{CMAX}(i)$$

Equation 4

Here, when the sum of total transmission power, with which the UE transmits an SRS, exceeds $\hat{P}_{CMAX}(i)$, the UE scales $\hat{P}_{SRS,c}(i)$ of a subframe i and the serving cell c by using Equation 5 below.

$$\sum_{c} w(i) \cdot \hat{P}_{SRS,c}(i) \leq \hat{P}_{CMAX}(i)$$

Equation 5

In Equation 5, $\hat{P}_{SRS,c}(i)$ represents a linear value of $P_{SRS,c}(i)$, and $\hat{P}_{CMAX}(i)$ is defined in the subframe i and represents a linear value of $P_{CMAX}$. w(i) represents a scaling factor of $\hat{P}_{SRS,c}(i)$ for the serving cell c, and satisfies 0≤w(i)≤1. w(i) has an identical value in serving cells.

According to the related art, when a UE simultaneously transmits a UL data channel, a UL control channel, and a UL signal to a BS under CA, only the transmission of a PUCCH in one serving cell (e.g., a primary serving cell (hereinafter "Pcell")) is considered and the transmission of a PUCCH in another serving cell, which is not the Pcell, is not considered. Accordingly, when the transmission of a PUCCH in another serving cell which is not the Pcell is considered, namely, when the transmission of a PUCCH in each of the Pcell and another serving cell and simultaneous transmission of a PUCCH through different serving cells are considered, it is necessary to newly define and apply a multiplexing method or power control methods between UL channels. Specifically, when the UE transmits a UL data channel, a UL control channel, and a UL signal to a BS, an ambiguity occurs, so that, according to current technology, both the BS and the UE cannot know how an operation of the UE is performed. Therefore, when multiple PUCCHs are configured, it is necessary to newly define a multiplexing method and power control methods for a UL data channel, a UL control channel, and a UL signal which are transmitted by the UE.

The present disclosure relates to a multiplexing method and a transmission power control method for multiple PUCCH(s) that the UE transmits in UL; a multiplexing method and a power control method for simultaneous transmissions of multiple PUCCH(s) and a PUSCH; a multiplexing method and a transmission power control method for simultaneous transmissions of multiple PUCCH(s) and multiple PUSCHs; and apparatuses using the same, when the transmission of a PUCCH in another serving cell which is not a Pcell is considered in a small cell environment and under TDD-FDD CA, namely, when the transmission of a PUCCH in each of the Pcell and another serving cell and simultaneous transmission of a PUCCH through different serving cells are considered.

The present disclosure relates to a multiplexing method and a transmission power control method for multiple PUCCH(s) that the UE transmits in UL; a multiplexing method and a power control method for simultaneous transmissions of multiple PUCCH(s) and a PUSCH; a multiplexing method and a transmission power control method for simultaneous transmissions of multiple PUCCH(s) and multiple PUSCHs; and apparatuses using the same, when the transmission of a PUCCH in another serving cell which is not a Pcell is considered in a small cell environment and under TDD-FDD CA, namely, when, for the UE, the BS configures transmissions of multiple PUCCHs through different serving cells or configures a PUCCH so as to be capable of being transmitted on an Scell.

When, for the UE, the BS configures transmissions of multiple PUCCHs through different serving cells or configures a PUCCH so as to be capable of being transmitted on an Scell, a method for each configuration may be a method for setting the transmission of multiple PUCCHs or the transmission of a PUCCH on an Scell (PUCCH on Scell) to be semi-statically configured through a new RRC parameter. A scheme implemented through an RRC parameter will be described in a specific method C.

When, for the UE, the BS configures and sets transmissions of multiple PUCCHs through different serving cells or configures and sets a PUCCH so as to be capable of being transmitted on an Scell, first, it is possible to perform simultaneous transmission of a PUCCH through the different serving cells. Accordingly, a multiplexing method and a power control method for PUCCHs simultaneously transmitted through different serving cells will be proposed below.

A power control method between multiple PUCCHs will be described.

Specific methods 1, 2, and 3 may be applied to a power limited case in which total transmission power exceeds maximum allowable transmission power P_CMAX of the UE at an overlapping part of symbols through which PUCCHs transmitted on different cells are transmitted.

Specific method 1) a method for setting transmission power of a PUCCH transmitted on each cell by using an identical scaling value may be considered for transmission power of PUCCHs transmitted on different cells. As one embodiment, transmission power control is configured to be performed over different PUCCHs, which are transmitted in an i-th subframe on the serving cell c, by using Equation 6 below.

$$\sum_c w(i) \cdot \hat{P}_{PUCCH,c}(i) \le \hat{P}_{CMAX}(i) \qquad \text{Equation 6}$$

The specific method 1 is a scheme for applying an identical scaling value to transmission power of a PUCCH transmitted on each cell.

Specific method 2) transmissions of PUCCHs may be converged on a particular Pcell. Thus, consideration may be given to a method for prioritizing transmission power for a transmission of a PUCCH on the particular Pcell. This method may be considered as a method for prioritizing transmission power of a Pcell, which is a particular cell among cells configured for the UE, when the UE transmits, to each BS, a PUCCH as a UL control channel corresponding to DL transmission transmitted by each BS.

Alternatively, a method for prioritizing transmission power of a PUCCH in a serving cell on which transmissions of PUCCHs as a feedback channel for different serving cells are converged may be considered as the method for prioritizing transmission power of a particular cell. Specifically, when a PUCCH is transmitted on each of two different cells, a PUCCH transmitted on a particular cell may be configured to transmit UCI (Hybrid Automatic Repeat reQuest (HARQ)-ACK and/or Channel Status Information (CSI) and/or a Scheduling Request (SR)) for multiple cells. Thus, this method is a method for prioritizing the setting of transmission power for the relevant PUCCH. In other words, this method is a method for determining a priority of the setting of power for each of PUCCHs transmitted through different serving cells, according to the number of serving cells included in UCI transmitted through a PUCCH transmitted on a particular serving cell, and performing power control.

As one embodiment, by using Equation 7 below, a PUCCH transmitted in an i-th subframe of a serving cell c, namely, a serving cell configured as a Pcell for the UE, may be configured to be prioritized over a PUCCH transmitted on another serving cell j. Transmission power control may be configured to be capable of being performed over different PUCCHs. Also, transmission power control may be configured to be capable of being performed over different PUCCHs, when the number of serving cells included in UCI transmitted through a PUCCH transmitted in the i-th subframe on the serving cell c is greater than the number of serving cells included in UCI transmitted through a PUCCH transmitted on the serving cell j.

$$\hat{P}_{PUCCH,j}(i) = \min\{\hat{P}_{PUCCH,j}(i), (\hat{P}_{CMAX}(i) - \hat{P}_{PUCCH,c}(i))\} \qquad \text{Equation 7}$$

When the former is identical to the latter in terms of the number of serving cells included in UCI, equal power scaling may be performed by using an identical scaling value between PUCCHs as in the specific method 1). Alternatively, a priority may be configured to be assigned to the type of feedback included in UCI, for example, a priority of transmission power control over PUCCHs transmitted on the serving cell c and the serving cell j may be configured to be determined according to a priority, such as HARQ-ACK or SR>Rank Indicator (RI)>Precoding Matrix Index (PMI) or CQI, HARQ-ACK>SR>RI>PMI or CQI, and SR>HARQ-ACK>RI>PMI or CQI, and power control may be configured to be capable of being performed.

The specific method 2 is a scheme for prioritizing and setting power in the case of a particular Pcell configured for the UE, a scheme for prioritizing and setting transmission power of a relevant serving cell when the number of serving cells included in UCI is large, and a scheme for putting a priority on the type of feedback included in UCI and prioritizing and setting transmission power, in allocating transmission power of multiple PUCCHs.

Specific method 3) HARQ-ACK may be most important information among pieces of UCI transmitted through a PUCCH. Thus, consideration may be given to a method for prioritizing transmission power of a PUCCH, according to the number of pieces of HARQ-ACK which is required to deliver HARQ-ACK similarly to a determination made of a priority of power control over a PUCCH, according to the number of serving cells included in UCI described in the specific method 2). Since a PUCCH transmitted on a particular cell may be configured to transmit pieces of HARQ-ACK for multiple cells, this method is a method for prioritizing the setting of transmission power for the relevant PUCCH. In other words, this method is a method for determining a priority of the setting of power for PUCCHs transmitted through different serving cells, according to the number of serving cells included in HARQ-ACK transmitted through a PUCCH of a particular serving cell, and performing power control.

As one embodiment, by using Equation 8 below, transmission power control may be configured to be capable of being performed over different PUCCHs, when the number of serving cells included in HARQ-ACK transmitted through a PUCCH of the serving cell c in the i-th subframe is greater than the number of serving cells included in HARQ-ACK transmitted through a PUCCH of the serving cell j.

$$\hat{P}_{PUCCH,j}(i) = \min\{\hat{P}_{PUCCH,j}(i), (\hat{P}_{CMAX}(i) - \hat{P}_{PUCCH,c}(i))\} \qquad \text{Equation 8}$$

When the former is identical to the latter in terms of the number of serving cells included in HARQ-ACK, equal power scaling may be configured to be capable of being performed by using an identical scaling value between PUCCHs as in the specific method 1). Alternatively, a PUCCH transmitted on a Pcell among PUCCHs may be configured to be prioritized and transmission power control may be configured to be capable of being performed, as in the specific method 2). Alternatively, a priority may be configured to be put on the type of feedback of UCI capable of being transmitted simultaneously with HARQ-ACK, for example, a priority of transmission power control over PUCCHs transmitted on the serving cell c and the serving cell j may be configured to be determined according to a priority, such SR>RI>PMI or CQI, and power control may be configured to be capable of being performed.

The specific method 3 is a scheme for prioritizing the setting of power which causes transmission power to be concentrated when the number of serving cells included in HARQ-ACK is large.

In the case of multiple PUCCHs, the description has been made of a scheme for identically scaling transmission power as described in the specific method 1; a scheme for prioritizing and setting power in the case of a particular Pcell configured for the UE as described in the specific method 2; a scheme for prioritizing and setting transmission power of a relevant serving cell when the number of serving cells included in UCI is large; a scheme for putting a priority on the type of feedback included in UCI and prioritizing and setting transmission power; or a scheme for prioritizing a case where the number of serving cells included in HARQ-ACK is large, and prioritizing the setting of power for the case, as described in the specific method 3.

FIG. 8 is a view illustrating an exemplary application of the specific method 1 according to an embodiment of the present disclosure.

FIG. 8 illustrates transmitting respective PUCCHs on two cells CC0 and CC1. In FIG. 8, a Pcell is indicated by reference numeral 810, and an Scell is indicated by reference numeral 820. When the specific method 1 is applied to transmissions in FIG. 8, an identical scaling value may be applied to transmissions of these PUCCHs. Specifically, applied scaling values become identical when the respective PUCCHs are transmitted on CC0 and CC1 in FIG. 8.

Figure 9:
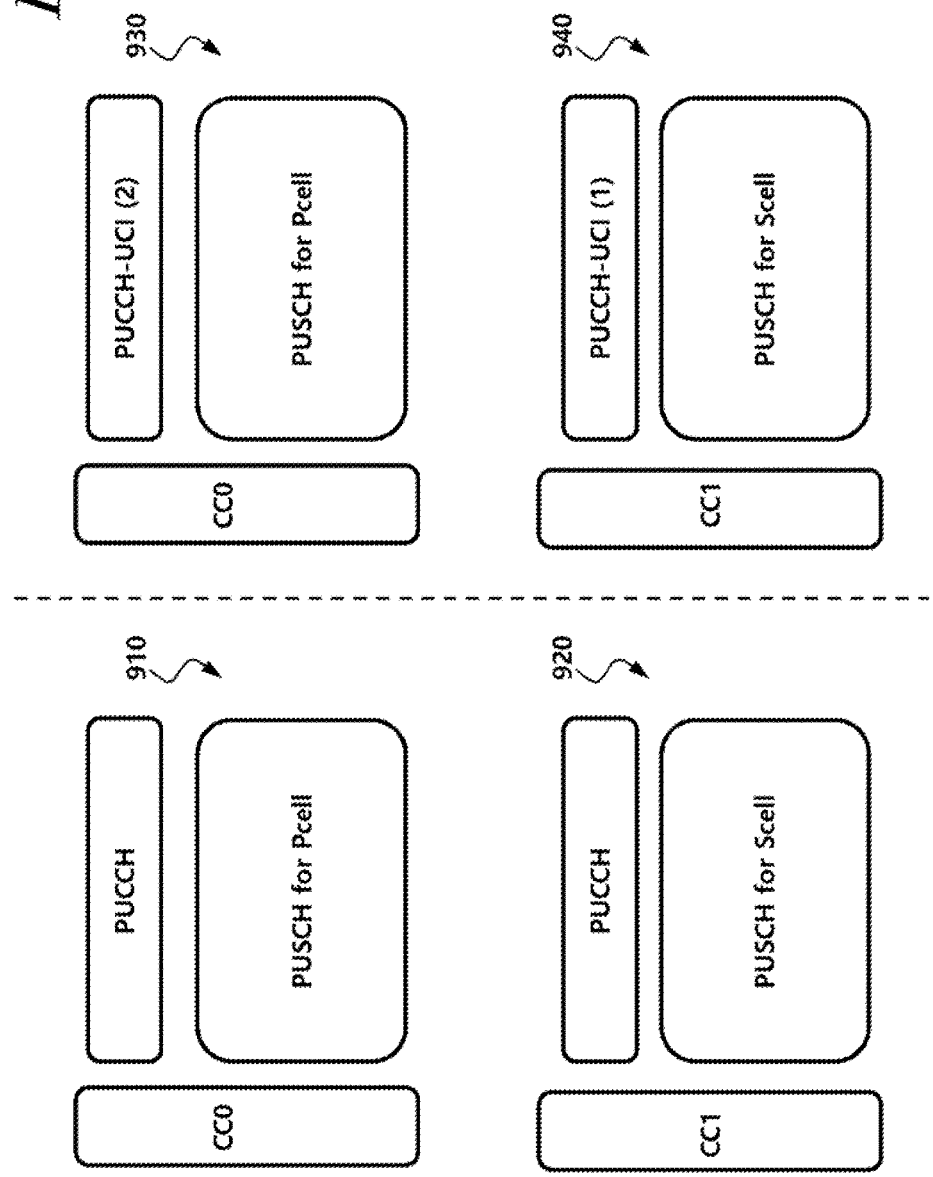
FIG. 9 is a view illustrating an exemplary application of a specific method 2 according to another embodiment of the present disclosure.

FIG. 9 is a view illustrating an exemplary application of the specific method 2 according to another embodiment of the present disclosure.

FIG. 9 illustrates transmitting respective PUCCHs on two cells CC0 and CC1. In FIG. 9, when the specific method 2 is applied where a Pcell indicated by reference numeral 910 and an Scell indicated by reference numeral 920 are configured for the UE, a particular Pcell configured for the UE may be configured to prioritize the setting of power for the particular Pcell during the transmissions of the PUCCHs. That is, transmission power of the PUCCH transmitted on the Pcell 910 is first allocated to the Pcell 910, and the remaining transmission power is allocated to the Scell 920.

The exemplary application will be described when both CC0 and CC1 include respective pieces of UCI. The number of serving cells included in UCI is equal to 2 in a PUCCH indicated by reference numeral 930, and the number of serving cells included in UCI is equal to 1 in a PUCCH indicated by reference numeral 940. The specific method 2 may be applied even to this case. It is possible to prioritize and set power of the PUCCH which is indicated by reference numeral 930 and includes a larger number of serving cells included in the UCI.

When the former is identical to the latter in terms of the number of serving cells included in UCI, equal power scaling may be performed by using an identical scaling value as described above, or transmission power of a particular Pcell may be configured to be prioritized. Alternatively, a priority may be determined according to the type of feedback included in UCI, as described above.

FIG. 10 is a view illustrating an exemplary application of the specific method 3 according to still another embodiment of the present disclosure.

The exemplary application is described when a PUCCH including HARQ-ACK is transmitted on each of two cells CC0 and CC1. In FIG. 10, the exemplary application is described in which the number of serving cells included in HARQ-ACK is equal to 2 in CC0 indicated by reference numeral 1010, and the number of serving cells included in HARQ-ACK is equal to 1 in CC1 indicated by reference numeral 1020. When the specific method 3 is applied, it is possible to prioritize and set power of the PUCCH of CC0 which includes a larger number of serving cells included in the HARQ-ACK.

When the former is identical to the latter in terms of the number of serving cells included in HARQ-ACK in the process of applying the specific method 3, identical scaling may be performed by applying the specific method 1, or a particular Pcell configured for the UE may be configured to prioritize the setting of power for the particular Pcell, by applying the specific method 2. Alternatively, when the number of serving cells included in UCI is large, transmission power of the relevant serving cell may be configured to be prioritized, or a priority may be put on the type of feedback included in UCI and transmission power may be configured to be prioritized.

Next, a power control method between multiple PUCCHs and a single/multiple PUSCHs will be described.

Specific methods A and B may be applied to a power limited case in which total transmission power exceeds maximum allowable transmission power P_CMAX of the UE at an overlapping part between symbols, through which PUCCHs transmitted on different cells are transmitted, and symbols through which PUSCHs transmitted on different cells are transmitted.

Specific method A) a method for setting transmission power of a PUSCH transmitted on each cell by using an identical scaling value may be considered for transmission power of PUSCHs transmitted on different cells. As one embodiment, transmission power control is configured to be performed over different PUSCHs, which are transmitted in an i-th subframe on a serving cell c, by using Equation 9 below. Specifically, this method is a method for setting transmission power to perform scaling by using an identical scaling value on transmission power of each of PUSCHs transmitted on respective cells with respect to remaining transmission power obtained by excluding transmission power allocated for multiple PUCCHs from maximum transmission power of the UE.

The UE scales $\hat{P}^{PUSCH,c}$ for the serving cell c in the i-th subframe so as to satisfy a condition of Equation 9 below.

$$\sum_c w_c(i) \cdot \hat{P}_{PUSCH,c}(i) \leq \left( \hat{P}_{CMAX}(i) - \sum_c z_c(i) \cdot \hat{P}_{PUCCH,c}(i) \right) \quad \text{Equation 9}$$

In Equation 9, $\hat{P}_{PUSCH,c}(i)$ represents a linear value of $P_{PUSCH,c}(i)$ in the i-th subframe, $\hat{P}_{PUSCH,c}(i)$ represents a linear value of $P_{PUSCH,c}(i)$ in the i-th subframe, and $\hat{P}_{CMAX}(i)$ represents a linear value of maximum output power $P_{CMAX}$ in the i-th subframe configured for the UE. Also, $w_c(i)$ represents a scaling factor of $\hat{P}_{PUSCH,c}(i)$ for the serving cell c, and has a range of $0 \leq w_c(i) \leq 1$. Further, $z_c(i)$ represents a scaling factor of $\hat{P}_{PUSCH,c}(i)$ for the serving cell c, and has a range of $0 \leq z_c(i) \leq \hat{P}_{PUCCH,c}(i)=0$ when a PUCCH is not transmitted in the i-th subframe.

The specific method A is an example of applying identical scaling to transmission power of each of PUSCHs.

Specific method B) consideration may be given to a method for allocating power to prioritize power of a PUSCH, through which UCI is transmitted, over power of a PUSCH without UCI in order to provide the guarantee of a detection probability and the reliability of UCI which is transmitted as a feedback channel for DL transmission when a PUSCH including UCI exists among PUSCHs transmitted on different cells.

As one embodiment, by using Equation 10 below, transmission power control may be configured to be capable of being performed over different PUSCHs transmitted on a serving cell c and a serving cell j in an i-th subframe. When the UE transmits multiple PUCCHs and a single/multiple PUSCHs, if a PUSCH transmitted on the serving cell j includes UCI and a PUSCH without UCI is transmitted on another remaining serving cell, the value of transmission power $\hat{P}_{PUSCH,c}(i)$ of a PUSCH for the serving cell c in the i-th subframe may be set by using Equation 10 below.

$$\hat{P}_{PUSCH,j}(i) = \min\left[\hat{P}_{PUSCH,j}(i)\left[\hat{P}_{CMAX}(i) - \sum_c z_c(i) \cdot \hat{P}_{PUCCH,c}(i)\right]\right]$$

$$\sum_{c \neq j} w_c(i) \cdot \hat{P}_{PUSCH,c}(i) \leq$$

$$\left[\hat{P}_{CMAX}(i) - \sum_c z_c(i) \cdot \hat{P}_{PUCCH,c}(i) - \hat{P}_{PUSCH,j}(i)\right]$$

Equation 10

In Equation 10, $\hat{P}_{PUSCH,c}(i)$ represents a linear value of $P_{PUSCH,c}(i)$ in the i-th subframe, $\hat{P}_{PUSCH,c}(i)$ represents a linear value of $P_{PUSCH,c}(i)$ in the i-th subframe of the serving cell c, and $P_{PUSCH,j}(i)$ represents transmission power of a PUSCH with UCI transmitted on the serving cell j and represents a linear value of $P_{PUSCH,j}(i)$ in a subframe. Also, $\hat{P}_{CMAX}(i)$ represents a linear value of maximum output power $P_{CMAX}$ in the i-th subframe configured for the UE. Also, $w_c(i)$ represents a scaling factor of $\hat{P}^{PUSCH,c}(i)$ for the serving cell c, and has a range of $0 \leq w(i) \leq 1$. Further, $z_c(i)$ represents a scaling factor of $\hat{P}_{PUSCH,c}(i)$ for the serving cell c, and has a range of $0 \leq z_c(i) \leq 1$. $\hat{P}_{PUCCH,c}(i)=0$ when a PUCCH is not transmitted in the i-th subframe.

In the specific method C, the UE and the BS may share indication information indicating simultaneous transmission of UCI on two or more cells through an RRC configuration parameter. This method may be selectively performed, and the BS may indicate the indication information to the UE in another scheme, which is not the RRC configuration parameter, or the indication information may be preset.

A specific method D is a scheme for previously configuring a cell. According to the specific method D, a first cell and a second cell may be respectively configured as a Pcell and an Scell or as an Scell and a Pcell. The specific method D allows discrimination to be made between a case in which the first cell is controlled by a master BS and the second cell is controlled by a secondary BS, and a case in which the second cell is controlled by the master BS and the first cell is controlled by the secondary BS. The specific method D may set this information to be shared between the BS and the UE.

Figure 11:
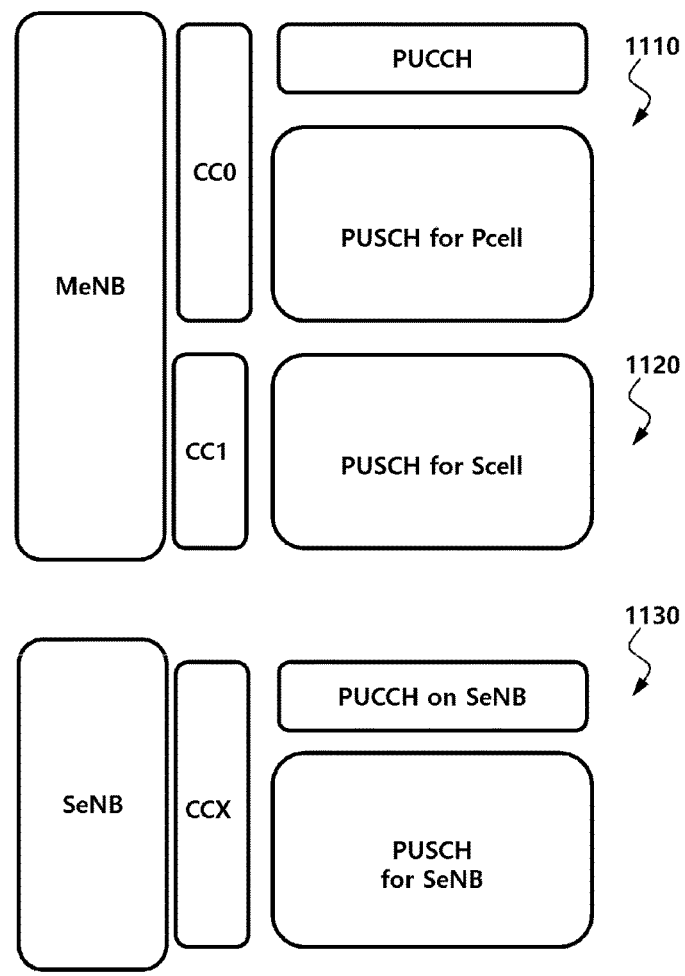
FIG. 11 is a view illustrating an exemplary of a specific method A according to yet another embodiment of the present disclosure.

FIG. 11 is a view illustrating an exemplary application of the specific method A according to yet another embodiment of the present disclosure.

In FIG. 11, a PUCCH is transmitted on CC0 among cells of a MeNB(as indicated by reference numeral 1110), and a PUSCH is transmitted on CC1 (as indicated by reference numeral 1120). Meanwhile, a PUCCH is transmitted on a cell CCx of a SeNB (as indicated by reference numeral 1130). Here, CCx becomes CC0 when a cell index of the SeNB is set independently of the MeNB, and becomes CC2 when the cell index of the SeNB is set in association with the MeNB.

Here, when the specific method A is applied to PUSCHs transmitted on respective cells, an identical scaling value is applied. Specifically, $w_c(i)$ in Equation 9 has a value to which a value of $w_0(i)$ of CC0 is equal, to which that of $w_1(i)$ of CC1 is equal, and to which that of $w_x(i)$ of CCx is equal. In this regard, in the case of CC0, a PUCCH is transmitted on CC0. Accordingly, transmission power of a PUCCH is first allocated, and then transmission power of a PUSCH is allocated.

Figure 12:
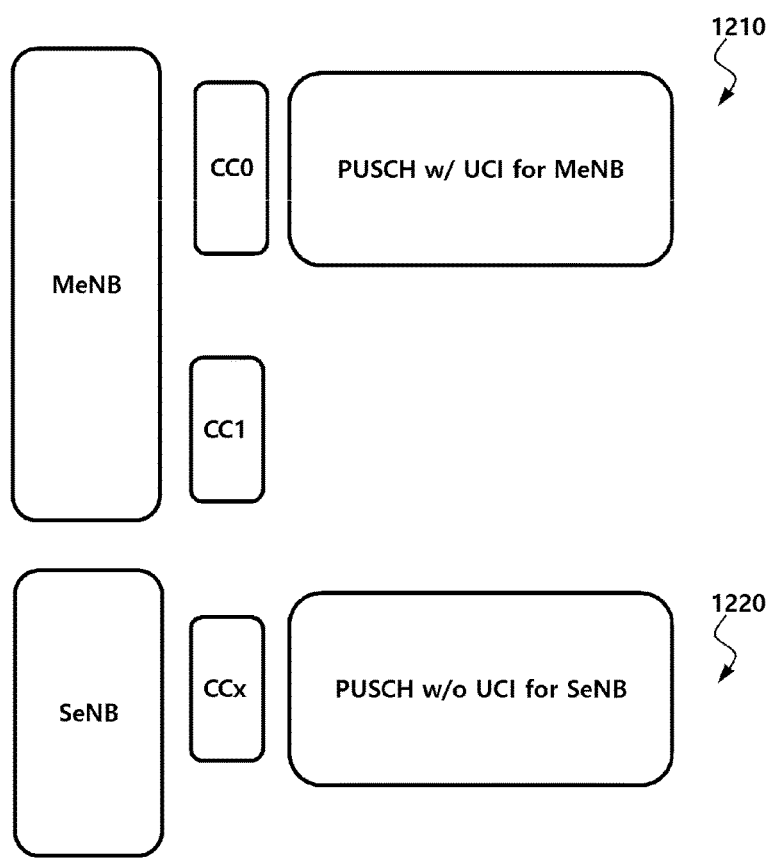
FIG. 12 is a view illustrating an exemplary of a specific method B according to still yet another embodiment of the present disclosure.

FIG. 12 is a view illustrating an exemplary application of the specific method B according to still yet another embodiment of the present disclosure.

The specific method B is a method for first allocating transmission power of a PUSCH with UCI, which is control information, when a data channel including UCI and a data channel, which does not include UCI, are transmitted to different BSs. In FIG. 12, CC0 is a PUSCH with UCI transmitted to a MeNB (as indicated by reference numeral 1210), and CCx is a PUSCH without UCI transmitted to the SeNB (as indicated by reference numeral 1220). Accordingly, when Equation 10 is applied to the allocation of transmission power of a PUSCH, transmission power of a PUSCH with UCI of CC0 transmitted to the MeNB is allocated, and then remaining transmission power is allocated to the PUSCH (as indicated by reference numeral 1220) transmitted to remaining SeNBs.

Figure 13:
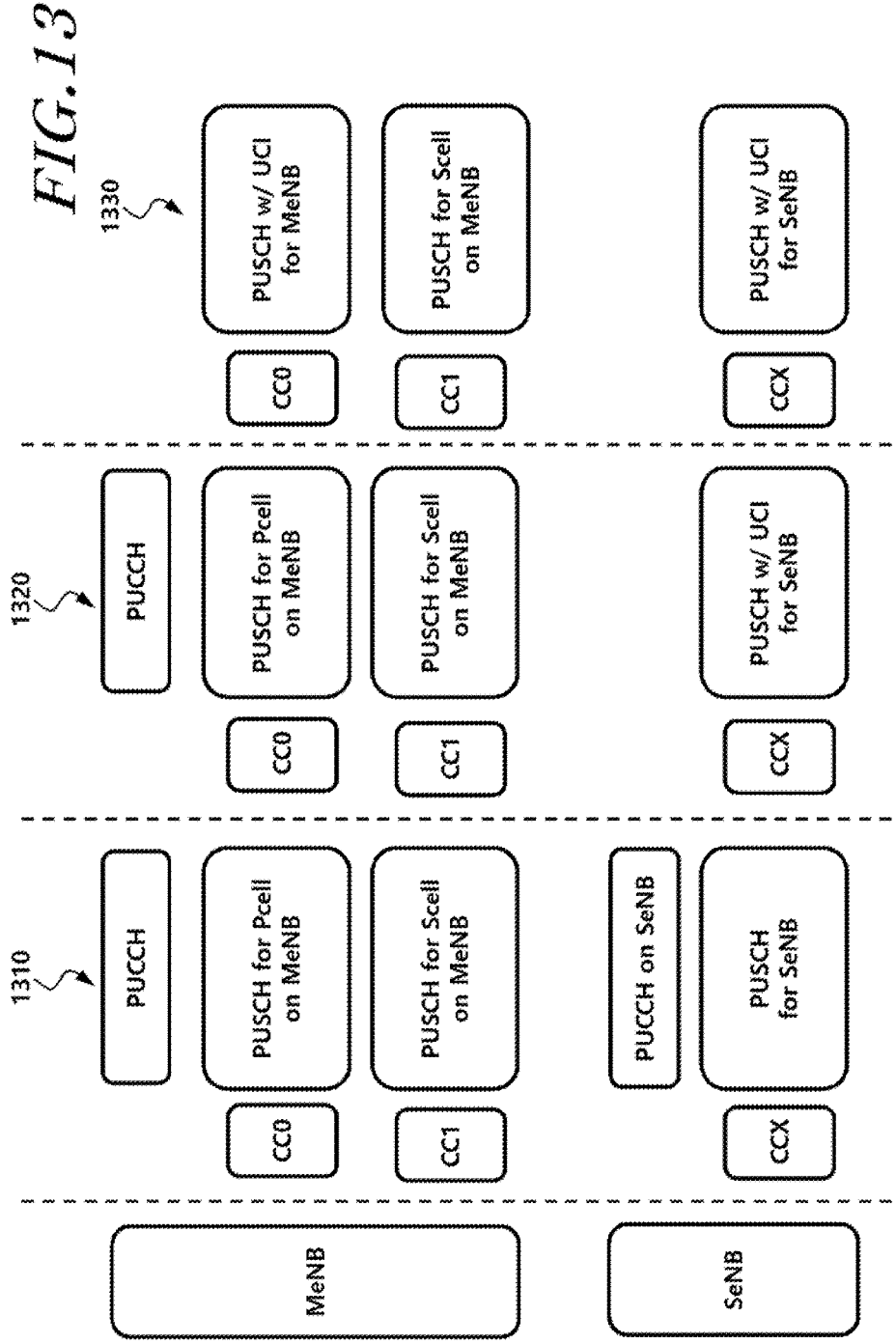
FIG. 13 is a view illustrating uplink transmission according to still another embodiment of the present disclosure.

FIG. 13 is a view illustrating UL transmission according to still another embodiment of the present disclosure.

In FIG. 13, CCx becomes CC0 when a cell index of a SeNB is set independently of a MeNB, and CCx becomes CC2 when the cell index of the SeNB is set in association with the MeNB.

Reference numeral 1310 shows a case in which a PUCCH is transmitted. Also, a PUCCH is transmitted on a MeNB and a SeNB. In this case, multiple PUCCHs are transmitted on multiple cells. Thus, one specific method may be selected from among the specific methods 1, 2, and 3. Specifically, the specific method 1 for setting an identical scaling value for respective PUCCHs may be applied; or the specific method 2 may be applied which proposes a scheme for prioritizing and setting power in the case of a particular Pcell configured for the UE, a scheme for prioritizing and setting transmission power of a relevant serving cell when the number of serving cells included in UCI is large, or a scheme for putting a priority on the type of feedback included in UCI and prioritizing and setting transmission power. Meanwhile, when a PUCCH of each of CC0 and CCx includes UCI, the specific method 3 may be applied for setting transmission power of a PUCCH, according to the number of pieces of HARQ-ACK among the pieces of UCI.

Reference numeral 1320 indicates a case in which a PUCCH is transmitted on CC0 and a PUSCH with UCI is transmitted on CCx. The specific method B may be applied to this case. After transmission power related to the PUCCH of CC0 is allocated, transmission power is allocated to prioritize transmission power of the PUSCH of CCx over transmission power of a PUSCH of each of CC0 and CC1.

The specific method B may also be applied to a case indicated by reference numeral 1330. In the specific method B, transmission power is first allocated to CC0 and CCx each of which includes UCI. A priority between CC0 and CCx, each of which includes UCI, may be determined in view of a priority of a Pcell, the number of pieces of UCI, or the number of pieces of HARQ-ACK included in UCI, as described in the specific method 2 and 3.

The above-described methods allow different CCs capable of being transmitted in UL to be configured as two or more CCs in an operation of the UE, and may be considered as methods which may be applied to both a case where multiple TAGs are not configured for the UE and a case where the multiple TAGs are configured for the UE. Also, the above-described methods define an operation of the UE according to a case where respective transmission situations of the UE are power-limited, namely, a case where total transmission power exceeds maximum allowable transmission power P_CMAX of the UE. The definition of the operation of the UE is to configure power control or dropping over a particular channel and a particular signal so as to be performed in transmitting a UL control channel or a UL data channel. It may be considered as a method capable of maximally ensuring transmissions of a UL control channel and a UL data channel on additional different CCs. The definition of the operation of the UE may be a method capable of preventing excessive power control from being performed over the UL control channel and the UL data channel, and thereby preventing the degradation of a data transmission rate of a data channel during CA.

The configurations proposed in the present disclosure, may also be considered when dual connectivity is performed in view of a small cell. That is, the configurations may be applied even in a scenario described below.

In this specification, when a UE configures dual connectivity, a BS will be described as a master BS or a first BS. Such a master BS (e.g., first BS) forms an RRC connection with the UE and provides a cell (e.g., a Pcell) that becomes a reference of a handover and terminates an S1-Mobility Management Entity (MME) and serves as a mobility anchor in a core network. The master BS or the first BS may be a BS which provides a macro cell or a BS which provides any one small cell in a situation of dual connectivity between small cells.

Meanwhile, in a dual connectivity environment, a BS, which is distinguished from the master BS and provides additional radio resources to the UE, will be described as a secondary BS or a second BS.

The first BS (or the master BS) and the second BS (or the secondary BS) may each provide at least one cell to the UE and may be connected to each other through an interface therebetween.

Also, in order to help understanding, a cell associated with the first BS may be described as a macro cell, and a cell associated with the second BS may be described as a small cell. However, in a small cell cluster scenario described below, even a cell associated with the first BS may be described as a small cell.

In embodiments of the present disclosure, a macro cell may denote each of one or more cells or may be described in the sense of being representative of all cells associated with the first BS. Also, a small cell may indicate each of one or more cells or may be described in the sense of being representative of all cells associated with the second BS. However, as described above, in a particular scenario such as a small cell cluster, a small cell may be a cell associated with the first BS. In this case, a cell of the second BS may be described as another small cell or still another small cell.

In this regard, in describing the following embodiments of the present disclosure, for convenience of description, a macrocell may be associated with a master BS or a first BS, and a small cell may be associated with a secondary BS or a second BS. However, the present disclosure is not limited thereto, and the present disclosure will be applied to even a case in which the secondary BS or the second BS may be associated with a macrocell, and the master BS or the first BS may be associated with the small cell.

Since transmission to a single BS and UL transmissions to different BSs can be configured, it may be considered a method for notifying the UE of the relevant configuration. Specifically, an RRC configuration parameter, such as "simultaneous UL transmission to both MeNB and SeNB" may be set, the above-presented operation of the UE and the above-presented power control method according to the setting may be applied. In addition to UL transmission using "simultaneous UL transmission to both MeNB and SeNB," a method for configuring RRC parameters having various forms may be considered. Specifically, a method may be provided for configuring UCI transmission, HARQ-ACK transmission, CQI transmission, SR transmission, HARQ-ACK and CQI transmission, HARQ-ACK and SR transmission, SR and CQI transmission, SRS transmission, HARQ-ACK and SRS transmission, and CQI and SRS transmission, instead of UL transmission. Senses of the respective transmissions may signify simultaneous transmissions of a channel and a Reference Signal (RS) in respective ULs to different BSs, from the perspective of the UE.

When UL transmissions to different BSs are configured, the power control method proposed in the present disclosure may be considered according to information to be transmitted to a first BS (a master BS or a macro BS), or information to be transmitted to a second BS (a master BS or a macro BS), in which the first BS and the second BS are the types of different BSs. Specifically, the importance of the master BS or the macro BS, which is the first BS and establishes an RRC connection, may be large. Accordingly, consideration may be given to the power control method which is proposed in the present disclosure and allocates power in such a manner as to prioritize a UL control channel transmitted to the relevant first BS over a UL control channel transmitted to the second BS. Also, power control may be performed according to a priority of the type of UCI transmitted in UL in combination with the power control method. For example, the control method proposed in the present disclosure may be considered according to HARQ-ACK>=SR>CQI. Specifically, although the description has been made as a Pcell and an Scell in the present disclosure, the relevant Pcell may be considered as a cell belonging to the first BS, and the Scell may be considered as a cell belonging to the second BS. A PUCCH is a channel capable of transmitting HARQ-ACK, SR, and CQI, and a PUSCH with UCI is a channel capable of transmitting HARQ-ACK, RI, CQI, PMI, and the like. Accordingly, when a priority is put on the transmission of HARQ-ACK and transmissions are performed to different BSs, consideration may be given to a method for setting power during the execution of power control in such a manner as to prioritize the transmission of a PUSCH with HARQ-ACK over the transmission of a PUCCH through which a CQI is transmitted.

Hereinafter, when consideration is given to the transmission of a PUCCH on a serving cell which is not a Pcell in a small cell environment and under TDD-FDD CA, namely, when consideration is given to the transmission of a PUCCH on a Pcell and another serving cell and simultaneous transmission of a PUCCH through different serving cells, a description will be made of a power control method for transmissions of multiple PUCCHs and a PUSCH according to multiple PUCCH(s) that the UE transmits in UL, and an apparatus for implementing the same.

Figure 14:
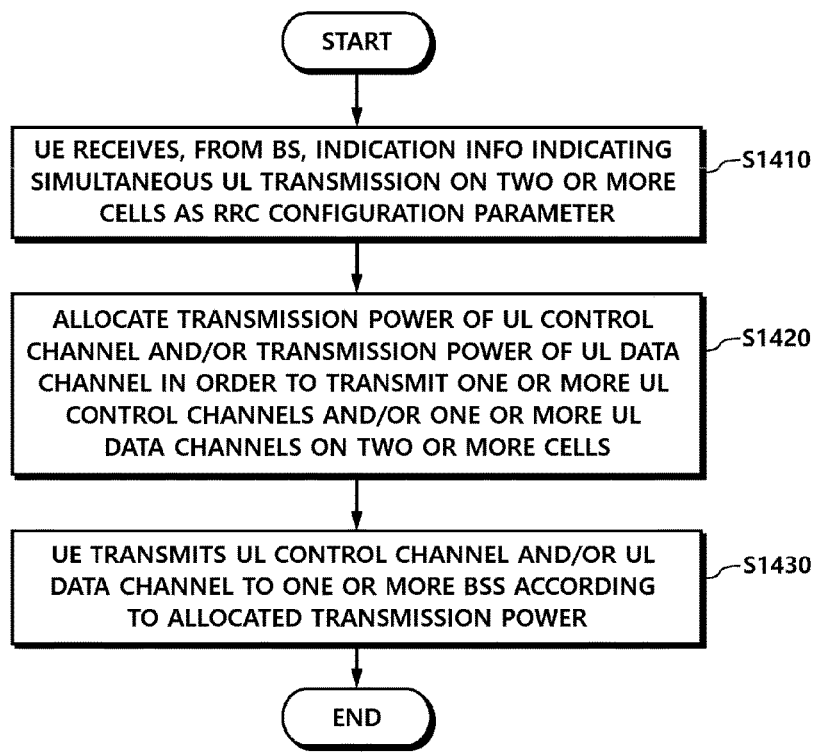
FIG. 14 is a view illustrating a process for controlling power of uplink transmission by a user equipment according to an embodiment of the present disclosure.

FIG. 14 is a flowchart illustrating a process for controlling power of uplink transmission by a user equipment (UE) according to an embodiment of the present disclosure.

The UE performs UL transmission on two or more cells.

First, in step S1410, the UE receives, from the BS, indication information indicating simultaneous UL transmission on the two or more cells as an RRC configuration parameter, as described in the specific method C. Step S1410 may be selectively performed, and such indication may be instructed or preset with another method without using the RRC configuration parameter.

Then, when the simultaneous transmission is configured according to the indication information, transmission power of each of a UL control channel and a UL data channel is controlled. Specifically, in step S1420, the UE allocates transmission power of a UL control channel and/or transmission power of a UL data channel in order to transmit the one or more UL control channels and/or the one or more UL data channels on the two or more cells. A scheme for allocating transmission power may be variously applied according to a scheme for prioritizing and allocating transmission power and a scaling scheme, and the scheme has been described above in the specific methods 1, 2, and 3, and A, B, and C. The specific method 1 is a scheme for scaling transmission power of a PUCCH of each cell. The specific methods 2 and 3 may apply a priority of power allocation according to the type of UCI or the number of the pieces of UCI to transmission power so as to first allocate the transmission power according to a priority of a Pcell and the type of UCI or the number of the pieces of UCI which are included in the UL control channel or the UL data channel. In this specification, the type of UCI may indicate a UCI type.

Meanwhile, in the specific method A, in transmitting a PUSCH on multiple cells, the UE may perform transmission power control by applying an identical scaling value to the setting of transmission power for transmissions of two or more PUSCHs, which are scheduled to be transmitted, with respect to the remaining power except for transmission power of a PUCCH transmitted on the multiple cells.

Next, in applying the specific method B, the UE may prioritize a PUSCH with UCI over a PUSCH of another cell and may allocate transmission power to the PUSCH with UCI. Specifically, when a UL data channel to be transmitted on a first cell includes UCI under a situation in which the first cell and a second cell are configured, the UE allocates transmission power to prioritize transmission power of the UL data channel over transmission power of a UL data channel to be transmitted on the second cell.

Also, as described in the specific method D, the first cell and the second cell may be respectively configured as a Pcell and an Scell or as an Scell and a Pcell, and a case in which the first cell is controlled by a master BS and the second cell is controlled by a secondary BS may be distinguished from a case in which the second cell is controlled by the master BS and the first cell is controlled by the secondary BS.

When the allocation of transmission power is completed according to the various schemes, in step S1430, the UE transmits the UL control channel and/or the UL data channel to one or more BSs according to the allocated transmission power.

Figure 15:
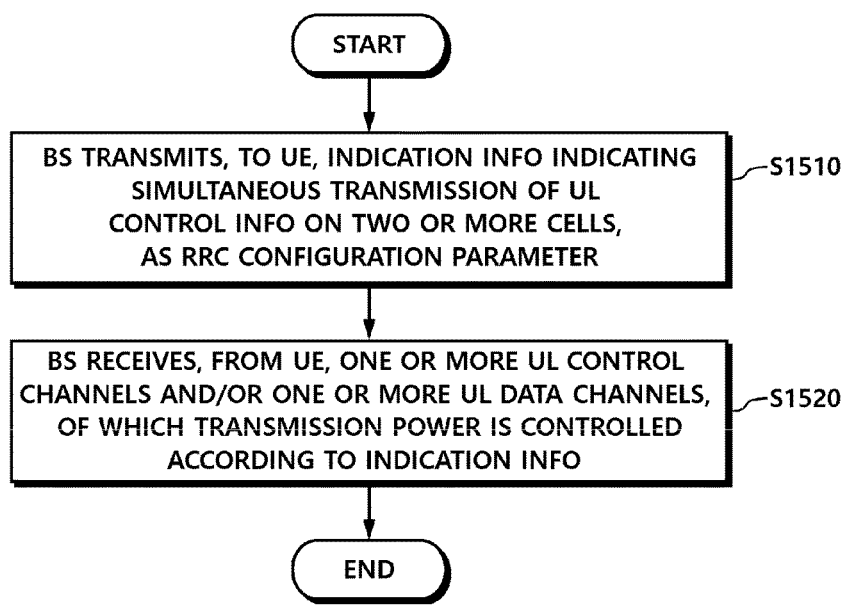
FIG. 15 is a view illustrating a process in which a base station receives an uplink signal transmitted in a state of controlling transmission power according to an embodiment of the present disclosure.

FIG. 15 is a flowchart illustrating a process of a BS for receiving an uplink signal transmitted in a state of controlling transmission power according to an embodiment of the present disclosure.

The BS may transmit corresponding indication information to the UE so that the UE may perform UL transmission on two or more cells. An example of the indication information may be an RRC configuration parameter. More specifically, in step S1510, the BS transmits, to the UE, an RRC configuration parameter as indication information indicating simultaneous transmission of UL control information on the two or more cells. The RRC configuration parameter may indicate the configuration of not only simultaneous UL transmission but also UCI transmission, HARQ-ACK transmission, CQI transmission, SR transmission, HARQ-ACK and CQI transmission, HARQ-ACK and SR transmission, SR and CQI transmission, SRS transmission, HARQ-ACK and SRS transmission, and CQI and SRS transmission.

In step S1520, the BS receives, from the UE, one or more UL control channels and/or one or more UL data channels, of which transmission power is controlled according to the indication information. The control schemes for the transmission power have been described in the specific methods 1, 2, and 3, and the specific methods A, B and D.

The specific method 1 is a scheme for identically scaling transmission power of a PUCCH of each cell. In the case of the specific methods 2 and 3, the type of UCI or the number of the pieces of UCI may be applied and UL transmission power may be controlled to prioritize and allocate transmission power according to a priority of a particular Pcell and the type of UCI or the number of the pieces of UCI which is included in the UL control channel or the UL data channel.

Meanwhile, in the specific method A, in transmitting a PUSCH on multiple cells, the UE may perform transmission power control by applying an identical scaling value to the setting of transmission power for the transmission of two or more PUSCHs, which are scheduled to be transmitted, with respect to the remaining power except for transmission power of a PUCCH transmitted on the multiple cells.

Next, in applying the specific method B, the UE may prioritize a PUSCH with UCI over a PUSCH of another cell and may allocate transmission power to the PUSCH with UCI. Specifically, when a UL data channel to be transmitted on a first cell includes UCI under a situation in which the first cell and a second cell are configured, the UE allocates transmission power to prioritize transmission power of the UL data channel over transmission power of a UL data channel to be transmitted on the second cell.

Also, as described in the specific method D, the first cell and the second cell may be respectively configured as a Pcell and an Scell or as an Scell and a Pcell, and a case in which the first cell is controlled by a master BS and the second cell is controlled by a secondary BS may be distinguished from a case in which the second cell is controlled by the master BS and the first cell is controlled by the secondary BS.

Figure 16:
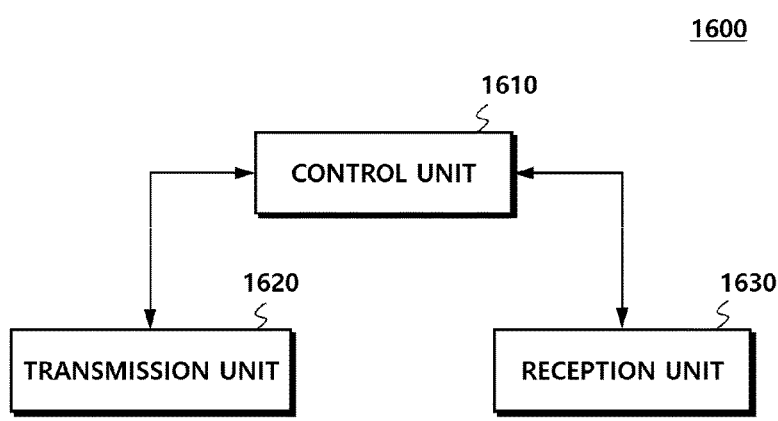
FIG. 16 is a view illustrating a configuration of a user equipment according to still another embodiment of the present disclosure.

FIG. 16 illustrates a configuration of a UE according to still another embodiment of the present disclosure.

Referring to FIG. 16, the UE 1600 according to still another embodiment of the present disclosure includes a reception unit 1630, a control unit 1610, and a transmission unit 1620.

The reception unit 1630 receives DL control information, DL data, and a message through a relevant channel from the BS.

Also, the control unit 1610 controls an overall operation of the UE according to power control over transmissions of multiple PUCCHs and a PUSCH according to multiple PUCCH(s) that the UE transmits in UL, when consideration is given to the transmission of a PUCCH on a serving cell which is not a Pcell in a small cell environment and TDD-FDD CA required to perform the above-described present invention, namely, when consideration is given to the transmission of a PUCCH on a Pcell and another serving cell and simultaneous transmission of a PUCCH through different serving cells.

The transmission unit 1620 transmits UL control information, UL data, and a message through a relevant channel to the BS.

The configuration of the UE will be described in more detail below.

The reception unit 1630 receives a DL channel from the BS. The control unit 1610 allocates transmission power of a UL control channel and/or transmission power of a UL data channel in order to transmit the one or more UL control channels and/or the one or more UL data channels on two or more cells. Then, the transmission unit 1620 transmits the UL control channel and/or the UL data channel to one or more BSs according to the allocated transmission power.

In the case of the specific method 1, the control unit 1610 may scale transmission power of a PUCCH of each cell. In the case of the specific methods 2 and 3, the control unit 1610 may apply the type of UCI or the number of the pieces of UCI, which is included in the UL control channel or the UL data channel, and the control unit 1610 may allocate transmission power to prioritize and allocate transmission power according to the type of UCI or the number of the pieces of UCI which is included in the UL control channel or the UL data channel.

In the specific method A, the control unit 1610 may allocate transmission power of a UL data channel on a first cell within a value obtained by excluding a value, which is obtained by scaling transmission power of a UL control channel transmitted on the first cell by using a scaling factor of the first cell, from the total transmission power.

Next, the specific method B is described. When a UL data channel to be transmitted on the first cell includes UCI, the control unit 1610 allocates transmission power to prioritize transmission power of the UL data channel over a UL data channel to be transmitted on the second cell. Specifically, when a UL data channel to be transmitted on the first cell includes UCI under a situation in which the first cell and the second cell are configured, the control unit 1610 allocates transmission power to prioritize transmission power of the UL data channel over transmission power of a UL data channel to be transmitted on the second cell.

As described in the specific method C, the reception unit 1630 receives, from the BS, an RRC configuration parameter as indication information indicating simultaneous UL transmission on the two or more cells as. This reception may be selectively performed. That is, the indication may be performed by another scheme or preset without using the RRC configuration parameter.

Also, as described in the specific method D, the first cell and the second cell may be respectively configured as a Pcell and an Scell or as an Scell and a Pcell. A case in which the first cell is controlled by a master BS and the second cell is controlled by a secondary BS may be distinguished from a case in which the second cell is controlled by the master BS and the first cell is controlled by the secondary BS.

Figure 17:
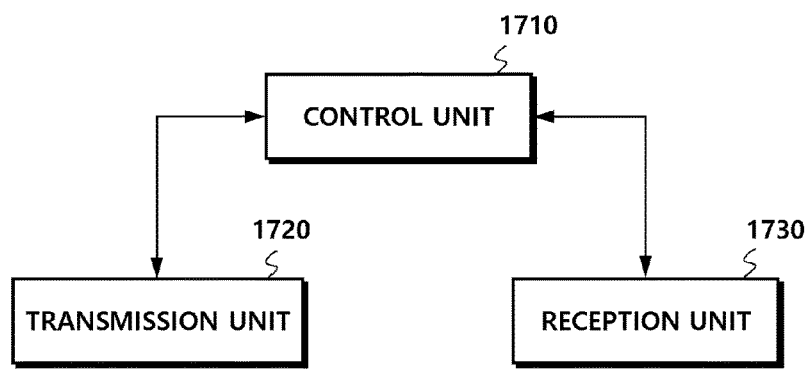
FIG. 17 is a view illustrating a configuration of a base station according to still another embodiment of the present disclosure.

FIG. 17 illustrates a configuration of a BS according to still another embodiment of the present disclosure.

Referring to FIG. 17, the BS 1700 according to still another embodiment of the present disclosure includes a control unit 1710, a transmission unit 1720, and a reception unit 1730.

The control unit 1710 controls an overall operation of the BS according to power control over transmissions of multiple PUCCHs and a PUSCH according to multiple PUCCH(s) that the UE transmits in UL, when transmitting a PUCCH on a serving cell which is not a Pcell in a small cell environment and when TDD-FDD CA is required to perform the above-described present disclosure, namely, when transmitting a PUCCH on a Pcell and another serving cell and when simultaneously transmitting a PUCCH through different serving cells.

The transmission unit 1720 and the reception unit 1730 are used to transmit and receive signals, messages, and data, which are required to perform the above-described present disclosure, to/from the UE.

More specifically, the transmission unit 1720 transmits, to the UE, an RRC configuration parameter as indication information indicating simultaneous transmission of UL control information on two or more cells. For example, one example of the indication information may be an RRC configuration parameter. More specifically, the BS transmits, to the UE, indication information indicating simultaneous UL transmission on the two or more cells, as an RRC configuration parameter. The RRC configuration parameter may indicate the configuration of not only simultaneous UL transmission but also UCI transmission, HARQ-ACK transmission, CQI transmission, SR transmission, HARQ-ACK and CQI transmission, HARQ-ACK and SR transmission, SR and CQI transmission, SRS transmission, HARQ-ACK and SRS transmission, and CQI and SRS transmission.

Also, the reception unit 1730 receives, from the UE, one or more UL control channels (PUCCHs) and/or one or more UL data channels (PUSCHs), of which transmission power is controlled, according to the indication information.

The control unit 1710 controls the transmission unit 1720 and the reception unit 1730.

The control schemes for the transmission power have been described in the specific methods 1, 2, and 3, and the specific methods A, B, and D.

The specific method 1 is a scheme for scaling transmission power of a PUCCH of each cell. In the case of the specific methods 2 and 3, the type of UCI or the number of the pieces of UCI may be applied and UL transmission power may be controlled to prioritize and allocate transmission power according to the type of UCI or the number of the pieces of UCI which is included in the UL control channel or the UL data channel.

In the specific method A, in transmitting a PUSCH on multiple cells, the UE may apply a scaling value for a PUSCH of the first cell. Specifically, transmission power of a UL data channel on the first cell is less than or equal to a value obtained by excluding a value, which is obtained by scaling transmission power of a UL control channel transmitted on the first cell by using a scaling factor of the first cell, from the total transmission power.

Next, in applying the specific method B, a PUSCH with UCI may be prioritized over a PUSCH of another cell and may be allocated transmission power. Specifically, when a UL data channel to be transmitted on the first cell includes UCI, the UL data channel may be prioritized over a UL data channel to be transmitted on the second cell and may be allocated transmission power.

Also, as described in the specific method D, the first cell and the second cell may be respectively configured as a Pcell and an Scell or as an Scell and a Pcell, and a case in which the first cell is controlled by a master BS and the second cell is controlled by a secondary BS may be distinguished from a case in which the second cell is controlled by the master BS and the first cell is controlled by the secondary BS.

Hereinabove, the description has been made of the multiplexing method and the transmission power control method for multiple control channels (multiple PUCCHs)

that the UE transmits in UL in a small cell environment and under TDD-FDD CA; the multiplexing method and the transmission power control method for simultaneous transmissions of multiple control channels and a PUSCH; the multiplexing method and the transmission power control method for simultaneous transmissions of multiple control channels and multiple PUSCHs; and apparatuses using the same.

The above description is only an illustrative description of the technical idea of the present disclosure, and those having ordinary knowledge in the technical field, to which the present disclosure pertains, will appreciate that various modifications and changes in form are possible without departing from the essential features of the present disclosure. Therefore, the embodiments disclosed in the present disclosure are intended not to limit but to describe the technical idea of the present disclosure, and thus do not limit the scope of the technical idea of the present disclosure. The protection scope of the present disclosure should be construed based on the appended claims, and all of the technical ideas included within the scope equivalent to the appended claims should be construed as being included within the right scope of the present disclosure.

The invention claimed is:

1. A method for controlling uplink transmission power of a user equipment by a base station, the method comprising:
    transmitting, to the user equipment, a Radio Resource Control (RRC) configuration parameter as indication information indicating simultaneous transmission of Uplink Control Information (UCI) on two or more cells; and
    receiving, from the user equipment, at least one Physical Uplink Control CHannel (PUCCH) and/or at least one Physical Uplink Shared CHannel (PUSCH), which have transmission power controlled according to the indication information,
    wherein the transmission power is determined according to a type of the UCI; and
    wherein a priority used to determine the transmission power is differently determined according to the type of the UCI.

2. The method as claimed in claim 1, wherein the transmission power is determined by a priority assigned to a cell belonging to a first base station among cells on which the PUCCH is transmitted.

3. The method as claimed in claim 1, wherein the transmission power is determined according to i) whether one of the PUCCH and the PUSCH includes UCI, ii) the type of the UCI, and iii) a number of the pieces of UCI.

4. The method as claimed in claim 1, wherein a Hybrid Automatic Repeat reQuest-ACKnowledgement (HARQ-ACK) and a Scheduling Request (SR) have a higher priority than a Channel Quality Indicator (CQI).

5. The method as claimed in claim 1, wherein:
    transmission power of a PUSCH on a first cell is less than or equal to a first value; and
    the first value is obtained by i) obtaining a second value by scaling transmission power of a PUCCH transmitted on the first cell using a scaling factor of the first cell and ii) subtracting the second value from total transmission power.

6. The method as claimed in claim 1, wherein when one of cells has a PUSCH including UCI to transmit, the PUSCH including UCI is prioritized over a PUSCH excluding UCI in the other cells, and the PUSCH is first allocated with transmission power.

7. The method as claimed in claim 1, wherein the transmission power is determined based on a priority assigned to the PUCCH including Hybrid Automatic Repeat reQuest-ACKnowledgement (HARQ-ACK).

8. A base station for controlling uplink transmission power of a user equipment, the base station comprising:
    a transmission unit for transmitting, to the user equipment, indication information indicating simultaneous transmission of Uplink Control Information (UCI) on two or more cells, as a Radio Resource Control (RRC) configuration parameter;
    a reception unit for receiving, from the user equipment, at least one Physical Uplink Control CHannel (PUCCH) and/or at least one Physical Uplink Shared CHannel (PUSCH), of which transmission power is controlled according to the indication information; and
    a control unit for controlling the transmission unit and the reception unit,
    wherein the transmission power is determined according to a type of the UCI; and
    wherein a priority used to determine the transmission power is differently determined according to the type of the UCI.

9. The base station as claimed in claim 8, wherein the transmission power is determined by a priority assigned to a cell belonging to a first base station among cells on which the PUCCH is transmitted.

10. The base station as claimed in claim 8, wherein the transmission power is determined according to i) whether one of the PUCCH and the PUSCH includes UCI, ii) the type of the UCI, and iii) a number of the pieces of UCI.

11. The base station as claimed in claim 8, wherein a Hybrid Automatic Repeat reQuest-ACKnowledgement (HARQ-ACK) and a Scheduling Request (SR) have a higher priority than a Channel Quality Indicator (CQI).

12. The base station as claimed in claim 8, wherein:
    transmission power of a PUSCH on a first cell is less than or equal to a first value; and
    the first value is obtained by i) obtaining a second value by scaling transmission power of a PUCCH transmitted on the first cell using a scaling factor of the first cell and ii) subtracting the second value from total transmission power.

13. The base station as claimed in claim 8, wherein when one of cells has a PUSCH including UCI to transmit, the PUSCH including UCI is prioritized over a PUSCH excluding UCI in the other cells, and the PUSCH is first allocated with transmission power.

14. The base station as claimed in claim 8, wherein the transmission power is determined based on a priority assigned to the PUCCH including Hybrid Automatic Repeat reQuest-ACKnowledgement (HARQ-ACK).

* * * * *